(12) United States Patent
Wiehink et al.

(10) Patent No.: US 11,050,295 B2
(45) Date of Patent: Jun. 29, 2021

(54) METHOD FOR BALANCING POWER LOADS IN AN ELECTRICAL POWER GRID

(71) Applicant: GROENEWIJKSTROOM B.V., Arnhem (NL)

(72) Inventors: Luuk Johannes Maria Wiehink, Arnhem (NL); Roel Gerard Oortgiesen, Arnhem (NL)

(73) Assignee: GROENEWIJKSTROOM B.V., Arnhem (NL)

( * ) Notice: Subject to any disclaimer, the term of this patent is extended or adjusted under 35 U.S.C. 154(b) by 0 days.

(21) Appl. No.: 16/472,933

(22) PCT Filed: Dec. 27, 2017

(86) PCT No.: PCT/NL2017/050880
§ 371 (c)(1),
(2) Date: Jun. 24, 2019

(87) PCT Pub. No.: WO2018/117848
PCT Pub. Date: Jun. 28, 2018

(65) Prior Publication Data
US 2019/0356163 A1    Nov. 21, 2019

(30) Foreign Application Priority Data
Dec. 23, 2016   (NL) .................................... 2018080

(51) Int. Cl.
*H02J 13/00*  (2006.01)
*H02J 3/28*   (2006.01)
(52) U.S. Cl.
CPC .......... *H02J 13/00007* (2020.01); *H02J 3/28* (2013.01); *H02J 13/0082* (2013.01); *H02J 13/0089* (2013.01)

(58) Field of Classification Search
CPC .... H02J 13/00007; H02J 3/28; H02J 13/0082; H02J 13/0089; H02J 2310/60;
(Continued)

(56) References Cited

U.S. PATENT DOCUMENTS

| 6,425,248 B1 * | 7/2002 | Tonomura ............... H02J 3/008 60/641.8 |
| 9,685,822 B2 * | 6/2017 | Nishiyama ........ H02J 13/00034 |

(Continued)

FOREIGN PATENT DOCUMENTS

| GB | 2514121 | 11/2014 |
| WO | 2015/019184 | 2/2015 |
| WO | 2016/002347 | 1/2016 |

OTHER PUBLICATIONS

International Search Report for PCT/NL2017/050880 dated Mar. 9, 2018, 2 pages.
(Continued)

*Primary Examiner* — Charles R Kasenge
(74) *Attorney, Agent, or Firm* — Nixon & Vanderhye P.C.

(57) ABSTRACT

The invention relates to a device, system and method for balancing power in an electrical power grid, to which a plurality of households are connected. The total electrical power production of those households that have a net electrical power production is calculated, as well as the total electrical power consumption of those households that have a net electrical power consumption. The ratio of the values obtained is then calculated, and compared to a predetermined value. Depending on the outcome of the comparison, a signal is created that triggers the switching of an apparatus in one of the households to an on-state or an off-state. In this way, an effective balancing of the supply with the consumption of electricity in a local low-voltage power grid has been achieved.

23 Claims, 6 Drawing Sheets

(58) Field of Classification Search
CPC .... H02J 2310/52; H02J 2300/40; H02J 3/381; H02J 3/32; H02J 3/144
See application file for complete search history.

(56) References Cited

U.S. PATENT DOCUMENTS

| | | | | |
|---|---|---|---|---|
| 2002/0033020 | A1* | 3/2002 | Tonomura | H02J 3/008 60/641.8 |
| 2008/0234871 | A1* | 9/2008 | Yamada | G06Q 50/06 700/286 |
| 2010/0235008 | A1* | 9/2010 | Forbes, Jr. | B60L 53/14 700/291 |
| 2011/0172841 | A1* | 7/2011 | Forbes, Jr. | H02J 3/14 700/292 |
| 2011/0196547 | A1* | 8/2011 | Park | H04L 12/12 700/296 |
| 2012/0016528 | A1* | 1/2012 | Raman | G06F 1/3206 700/291 |
| 2012/0065792 | A1 | 3/2012 | Yonezawa et al. | |
| 2012/0078431 | A1 | 3/2012 | Weatherhead | |
| 2012/0173177 | A1* | 7/2012 | Nishiyama | H02J 13/0017 702/62 |
| 2013/0046668 | A1 | 2/2013 | Al Faruque et al. | |
| 2013/0103221 | A1* | 4/2013 | Raman | G06F 1/3206 700/295 |
| 2014/0180968 | A1* | 6/2014 | Song | H02J 3/12 705/412 |
| 2017/0192042 | A1* | 7/2017 | Micali | G05F 1/66 |
| 2018/0013289 | A1* | 1/2018 | Uenishi | G06Q 50/06 |

OTHER PUBLICATIONS

Written Opinion of the International Searching Authority dated Jun. 28, 2018, issued in International Application No. PCT/NL2017/050880, 8 pages.

Communication Pursuant to Article 94(3) EPC dated Jul. 1, 2019, issued in European Application No. 16713609.2, 5 pages.

* cited by examiner

METHOD FOR BALANCING POWER LOADS IN AN ELECTRICAL POWER GRID

This application is the U.S. national phase of International Application No. PCT/NL2017/050880 filed Dec. 27, 2017 which designated the U.S. and claims priority to NL 2018080 filed Dec. 23, 2016, the entire contents of each of which are hereby incorporated by reference.

The invention relates to a device, system and method for balancing power in an electrical power grid, to a storage device for use therein, to a computer readable medium for use therein and to software arranged to perform the method of the invention.

In the last decades, there have been an increasing number of households that generate their own electric power with domestic power plants such as photovoltaic cells, solar thermal collectors, fuel cells or wind turbines. The electrical power thus obtained is often referred to as locally generated power or local power. Households that generate local power are usually still dependent on the power distribution grid that is conventionally present in residential neighborhoods, because their local power is not at all times of the day sufficient for their needs.

However, the grid does more than supplementing their energy needs, it also accommodates the surpluses of power that emerge when the power produced in a household exceeds the power that is consumed. This can easily happen, for example when on a sunny day nobody is at home to consume the electric power generated by photovoltaic cells. When the surplus power is then fed to the grid it is available to other households.

The increased number of bidirectional and intermittent power flows between households and the grid has led to increasing fluctuations of the power in the grid. This may cause damage to the electronic equipment in the grid's power distribution systems and leads to energy losses due to transport of power in the grid over undesirable long distances. Besides, it is current practice that domestic power plants are automatically shut off when the surplus power of the household to which they are connected reaches a certain limit. This means that in times of overproduction, domestic energy production capacity is deliberately cancelled to protect the power grid, which is inefficient and favors the use of the energy delivered by the grid, which is often generated from a fossil fuel in a large centralized electricity generating station.

Accordingly, there is a desire for a balance of power in the grid, i.e. a situation wherein the feeding of a surplus of power to the grid is balanced with the consumption of power from the grid. Many known solutions have already been proposed, but these often involve the introduction of new hardware in the grid, such as additional control centers, energy storage systems and/or additional microgrids that connect a selection of households. These solutions require the construction and allocation of structural elements in residential neighborhoods, which may require disruptive and tedious activities such as digging in the ground and building new facilities on the ground.

It is therefore an object of the present invention to introduce a balance of power in the grid, wherein the solution is non-invasive, i.e. a solution wherein the residential neighborhoods, and in particular the households themselves, do require only a minimal adaptation, or no adaptation at all.

Accordingly, the present invention relates to an electrical power balancing device (10) for balancing, in an electrical power grid (7), the feeding of a surplus of power to the grid with the consumption of power from the grid, the device (10) comprising a) a receiver (11) arranged to receive measurements from a group of grid-connected households (1) of their net electrical power transmission ($P_{net}$), wherein each household may have a net electrical power production ($P_{net\ production}$), a net electrical power consumption ($P_{net\ consumption}$) or a zero net electrical power transmission ($P_{net}$) (and thus a zero net electrical power production and a zero net electrical power consumption);

b) a first processor circuit (12) configured to calculate the total electrical power production ($P_{total\ production}$) of those households that have a net electrical power production and the total electrical power consumption ($P_{total\ consumption}$) of those households that have a net electrical power consumption;

c) a second processor circuit (13) configured to calculate the ratio of the total electrical power production and the total electrical power consumption ($P_{total\ production}/P_{total\ consumption}$);

d) a comparator (14) configured to determine whether the ratio ($P_{total\ production}/P_{total\ consumption}$) obtained by the second processor circuit is above a first predetermined value or below a second predetermined value;

e) a signal generator (15) configured to generate
 a first signal (16) when the ratio ($P_{total\ production}/P_{total\ consumption}$) is above the first predetermined value, wherein the first signal
  1) causes an electrical appliance (3b) in one of the households to turn on; and/or
  2) notifies that there is a net electrical power production in the group of households;
 a second signal (17) when the ratio ($P_{total\ production}/P_{total\ consumption}$) is below the second predetermined value, wherein the second signal
  1) causes an electrical appliance (3b) in one of the households to turn off; or
  2) notifies that there is a net electrical power consumption in the group of households.

Figure 1:
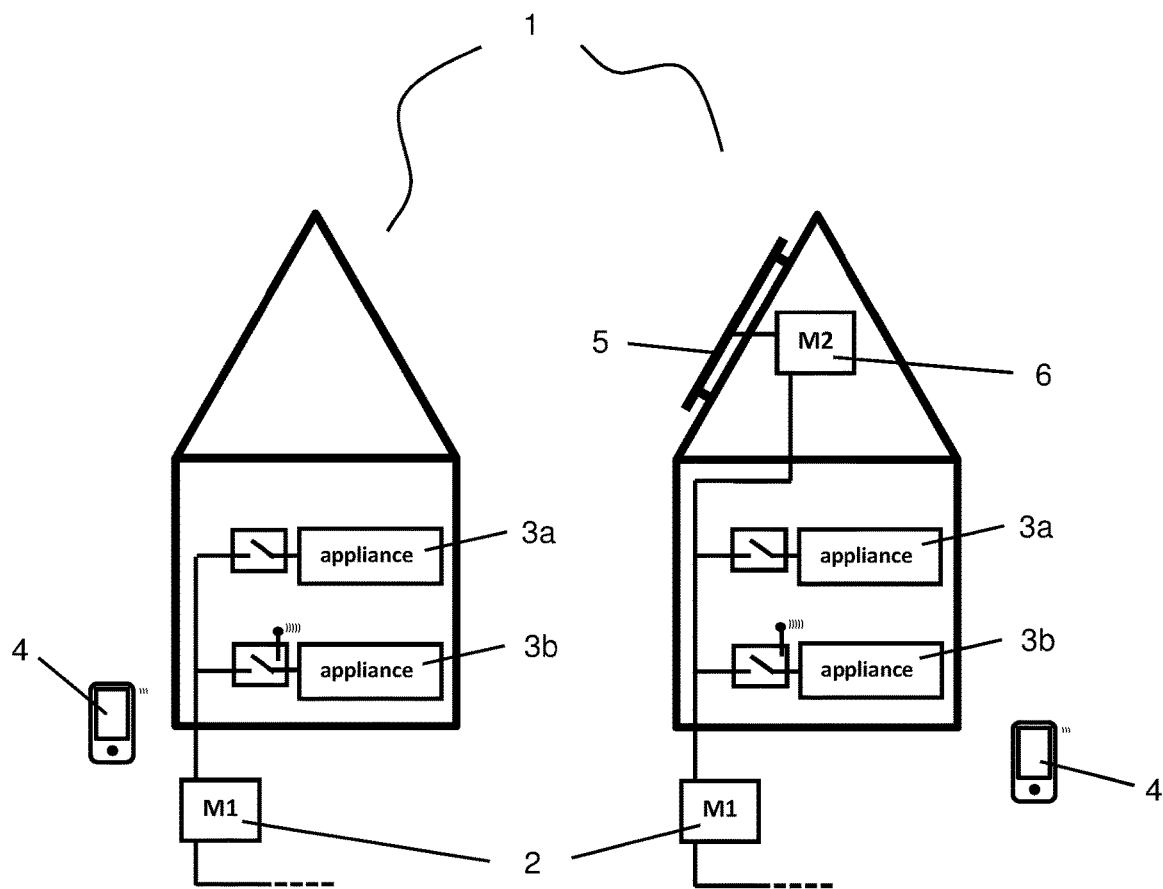
FIG. 1 is a schematic representation of households as present in the invention.

A power grid is the electrical system that connects electricity producers and consumers by transmission and distribution lines and related facilities. By producers are meant the centralized electricity generating stations such as electrical power plants, hydroelectric power stations, large-scale solar power stations and nuclear power plants. Inherent with such centralized facilities is that electricity is often to be transmitted over long distances. The final stage in the delivery of electric power to consumers occurs via power distribution grids, which is a network of distribution lines that actually makes the connection with each individual consumer.

In the last decade, on-site energy generation (i.e. decentralized energy generation) has become quite common in many households, allowing them to consume energy that is generated by themselves. In addition, they now have the possibility to deliver an eventual excess of electrical power to the grid themselves. Yet the conventional grid structure for delivering centrally generated power to consumers has not evolved correspondingly and is not well suited to accommodate for all this locally generated energy. Thus, there is a strong need for balancing the feeding of a surplus of power to the grid with the consumption of power from the grid. For the purpose of the invention, this will be referred to as balancing the loads of electrical power in a power grid. Given the enormous impact of modifying the conventional grid (which is for a large part underground), there is a strong desire to find a solution that requires a minimum of changes to the present physical infrastructure, or even no changes at all.

An important innovation in recent years is the introduction of the so-called "smart electricity meter" in households, which replaces the conventional analogous electromechanical induction meter wherein a metal disc rotates at a speed proportional to the power passing through the meter. This meter has been the standard for decades. In the coming years, in the majority of the households in the European Union this meter will be replaced with the so-called smart electricity meter. Such smart meters are usually characterized by the presence of two (digital) energy counters; a first counter that measures the net electrical power consumption of the household ($P_{net\ consumption}$; the amount of energy drawn from the grid) and a second counter that measures the net electrical power production of the household ($P_{net\ production}$; the amount of energy fed to the grid). Thus, the electric energy entering and exiting a household can be measured independently of each other, rather than that a net electrical energy is measured as is performed with the single counter of a conventional electricity meter. When the measuring device (the smart meter) is in operation and the household has a net electrical power transmission ($P_{net}$ is non-zero), only one of the counters at a time is counting, while the other is not. This is because there is either a net electrical power production in the household or a net electrical power consumption in the household (see also FIG. 7), which cannot co-exist. The net electrical power transmission ($P_{net}$) is then derived from the value of the particular counter.

Instead of two different counters, the measuring device may in principle also comprise a single (digital) counter that measures the transmission. In this way, net electrical power consumption ($P_{net\ consumption}$) and net electrical power production ($P_{net\ production}$) of the household cancel out for a great part; the one that is in excess generates the value for the net electrical power transmission ($P_{net}$). With such single meter, it is also possible to carry out the device, system and method of the invention.

The solution that is provided by the electrical power balancing device of the present invention makes use of the smart electricity meters in households. These meters can be configured to transfer the data of the energy that passes the meter to a central computer at regular time intervals, for example every ten seconds or every minute. In the invention, the electrical power balancing device is such central computer. When it receives and processes the data from a large number of households in a certain residential area, a total picture of the electrical power loads of the power grid in that residential area can be obtained in real-time.

The invention provides a device, system and method for balancing the loads of electrical power in a power grid. By a power grid is meant a power distribution grid, which is a network of distribution lines that actually makes the connection with each individual consumer. Thus, a power grid comprises grid-connected households. For the purpose of the invention, those grid-connected households that contribute to the invention by sending their data measured by their electricity meter to the central computer, together from a group of households.

It is recognized that not all households that are connected to the power grid (or at least to a certain area thereof) are necessarily part of the group of households as defined hereinabove for the purpose of the invention. For example, (a certain area of) the grid may comprise both types of households (i.e. those that are part of the group of households and those that are not). Typically, both types of households are intermixed in a (more or less) random manner. Preferably, however, the percentage of grid-connected households that is part of the group of households of the invention is as high as possible, so that as much as possible fluctuations in the grid are known and can be accommodated for—after all, fluctuations in the grid as such are not measured, only the energy consumption and energy production of the grid-connected households that are part of the group. Grid-connected households that are not part of the group of households will certainly also cause fluctuations in the grid because they consume energy from the grid and likely some of them will also deliver some of their own energy production to the grid. The higher the percentage of households that are part of the group of households of the invention, the better is the power balancing in the grid and the less is the effect of those households that are not part of it.

The area that is covered by the group of households may in principle have any size and shape. It may depend on the town-planning and the shape and/or topology of the grid. It may be more or less circular, for example with a smallest cross-section of 100 m or more.

The number of households in the group is at least two, but a higher number is preferred to prevent dominating effects of a few households on the entire group. For example, the number is at least 10, at least 25, at least 50, at least 100, at least 250, at least 500, at least 1,000, at least 5,000 or at least 10,000.

In principle, the device, the system and the method can already be effective when there is at least one household that is capable of generating its own electrical power and feeding it to the electrical grid. The percentage of such electricity-producing households in the group of households is therefore more than zero. Preferably, the percentage is at least 10%, for example in the range of 10-50%. It is however difficult to make general statements about this percentage, because the effectivity of the device, the system and the method also depends on the type of domestic power plants present in the group (e.g. solar energy only makes a contribution during the day, in contrast to wind energy), their (maximum) capacity, and the energy consumption pattern of all households of the group.

Figure 2:
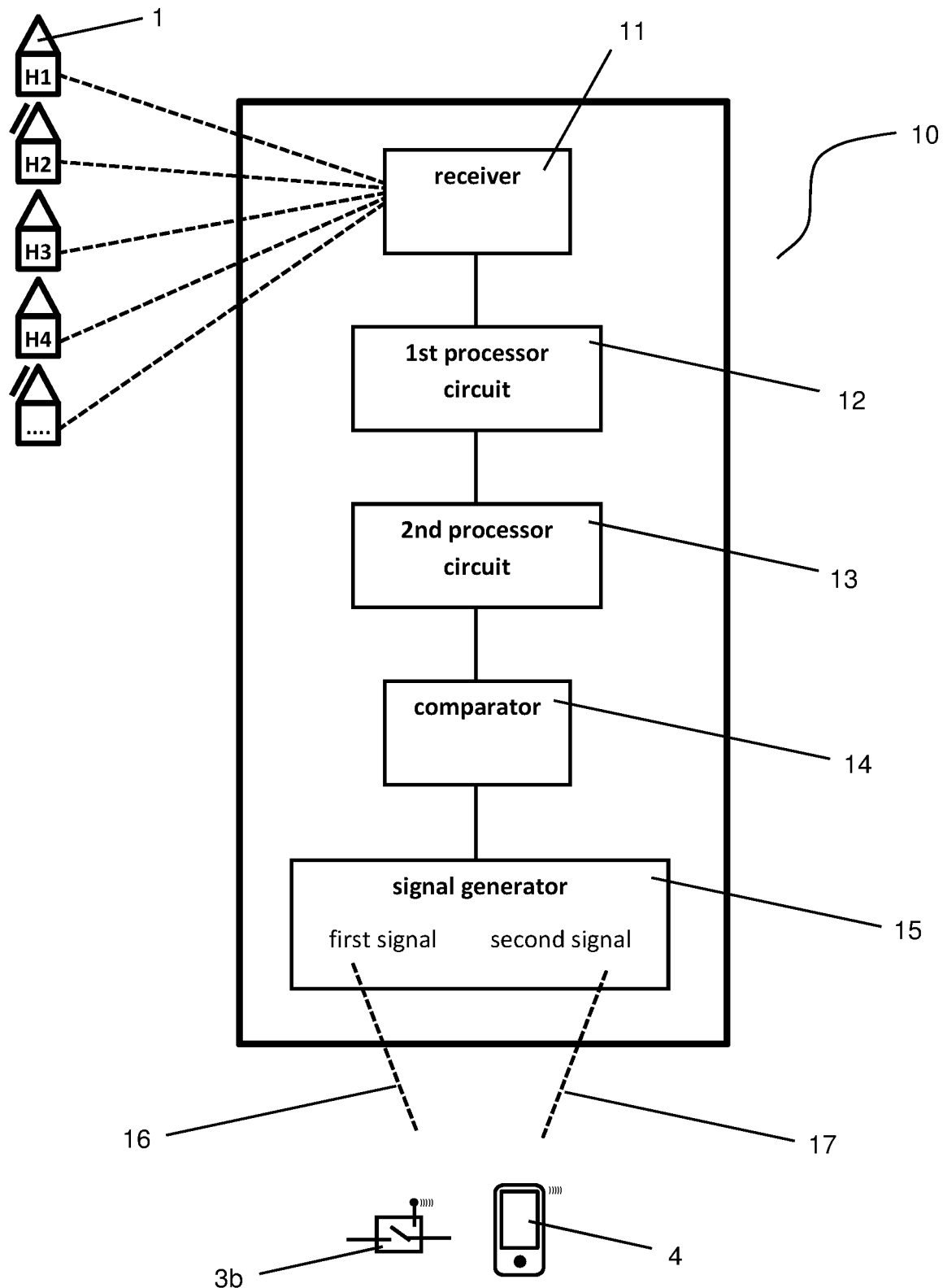
FIG. 2 is a schematic representation of an electrical power balancing device according to the invention.

FIG. 2 is a schematic representation of an electrical power balancing device (10) according to the invention.

An electrical power balancing device (10) of the invention comprises a receiver (11) that is arranged to receive data from the smart meters of households (1) that are connected to the power grid of a particular residential area. The households (1) are indicated in FIG. 2 as H1, H2, H3, H4, etc. These data concern the measurements of the net electrical power transmission ($P_{net}$) of each household, which may be a net electrical power production (electrical power is fed to the grid) or a net electrical power consumption (electrical power is drawn from the grid). The electrical power transmission ($P_{net}$) may theoretically also be zero, i.e. then there is no energy production and no energy consumption in the household.

The first processor circuit (12) that is present in the device performs calculations with the data obtained by the receiver (11). It is configured to make a summation of the net electrical power transmission ($P_{net}$) of those households (1) that have a net electrical power production, yielding the total electrical power production ($P_{total\ production}$) within the group of households. It is also configured to make a summation of the net electrical power transmission ($P_{net}$) of those households that have a net electrical power consumption, yielding the total electrical power consumption ($P_{total\ consumption}$) within the group of households.

The device (10) further comprises a second processor (13) circuit that calculates the ratio ($P_{total\ production}/P_{total\ consumption}$) of the total electrical power production and the total electrical power consumption in the group of households. When the ratio ($P_{total\ production}/P_{total\ consumption}$) equals 1, then there is no net production and no net consumption of energy. When it is >1, then there is a net production of energy and when it is <1, then there is a net consumption of energy.

The device further comprises a comparator (14) configured to determine whether the ration ($P_{total\ production}/P_{total\ consumption}$) obtained by the second processor circuit is above a first predetermined value or below a second predetermined value.

The signal generator (15) acts on the outcome of the action performed by the comparator. It generates a first signal (16) when the ratio ($P_{total\ production}/P_{total\ consumption}$) is above the first predetermined value; and it generates a second signal (17) when the ratio ($P_{total\ production}/P_{total\ consumption}$) is below the second predetermined value. The first signal (16) has the aim to increase the energy consumption (by e.g. causing an electrical appliance to turn on) while the second signal (17) has the aim to decrease the energy consumption (by e.g. causing an electrical appliance to turn off).

The aim of the first and the second signal of the signal generator (15) is to increase, respectively decrease, the energy consumption in a household. This may occur in the two ways.

In the first way, the signals operate a switch that is operably connected to the electrical appliance (3b), wherein the switch is configured to respond to both signals in the way that the first signal (16) causes the appliance to turn on and the second signal (17) causes the appliance to turn off.

In the second way, each of the two signals causes a specific notification to be given by a notification device (4), for example a sound or message on a display. The first signal (16) results in a notification that aims to inform the reader that there is a net electrical power production in the group of households, so that the reader can decide to turn on an appliance manually. The second signal (17) results in a notification that aims to inform the reader that there is a net electrical power consumption in the group of households, so that the reader can decide to turn off an appliance manually.

Figure 5:
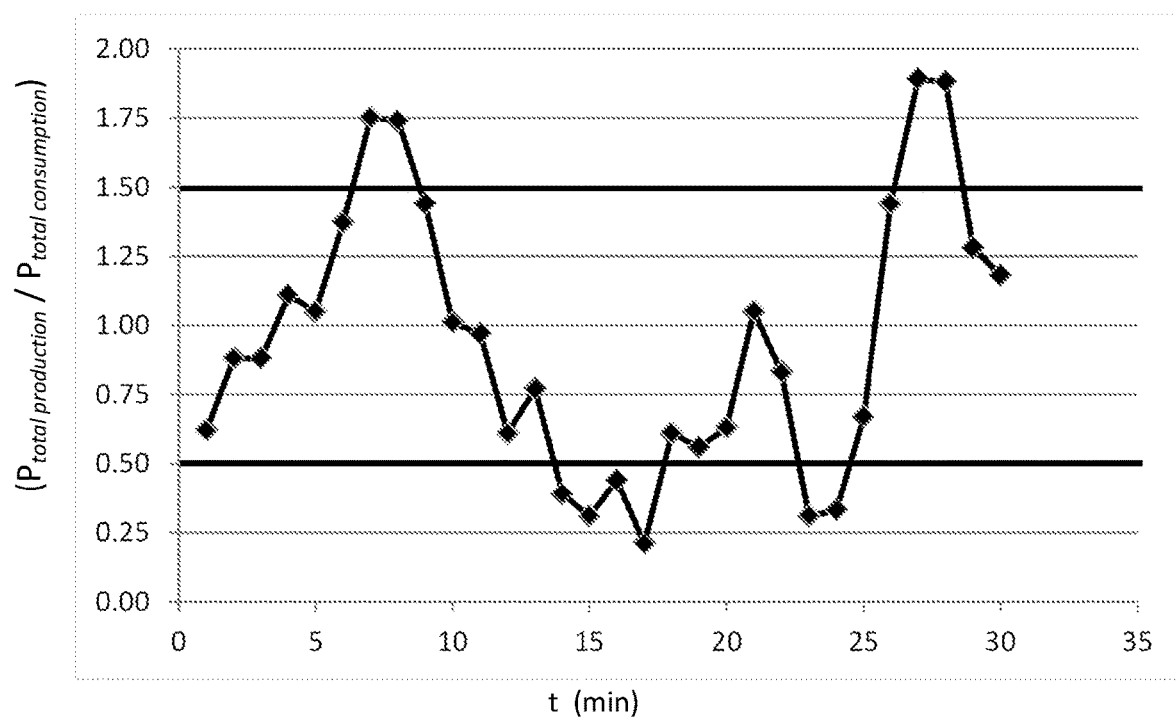
FIG. 5 is a fictitious graph of the ratio ($P_{total\ production}/P_{total\ consumption}$) against time.

The predetermined values serve as thresholds that trigger the generation of a signal when the threshold is passed. This is demonstrated in the graph in FIG. 5, which is a fictitious graph of the ratio ($P_{total\ production}/P_{total\ consumption}$) against time, which passes the first predetermined value and the second predetermined value several times. In this fictitious example, the first predetermined value is 1.5 and the second predetermined value is 0.5 (indicated with the bold lines in FIG. 5).

The threshold that needs to be passed for the first signal to be generated is usually different from the threshold that needs to be passed for the second signal to be generated. The presence of two predetermined values (and thus two thresholds) instead of one has the advantage that a change in the power loading of the grid less often results in the generation of a signal that causes an appliance to turn on or off or in a notification. This is because both thresholds have to be passed in order to move from the condition for generating the first signal to the condition for generating the second signal and vice versa—no signals are generated when the ratio ($P_{total\ production}/P_{total\ consumption}$) moves between the first and the second predetermined value and as a consequence no appliance will be turned on or off, neither will a notification be made.

The first predetermined value may be, independently of the second predetermined value, in the range of 1-5, in the range of 1-3, or in the range of 1-2. Preferably, it is in the range of 1.2 and 1.8. The second predetermined value may be, independently of the first predetermined value, in the range of 0.2-1, in the range of 0.3-1, or in the range of 0.5-1. Preferably, it is in the range of 0.5-0.75. Values for the predetermined values are chosen with the condition that the first predetermined value is equal to or higher than the second predetermined value. The two predetermined values can in a particular case also be identical values, so that there is effectively only one threshold.

In the above description of the power balancing device, the second processor circuit (13) is configured to calculate the ratio ($P_{total\ production}/P_{total\ consumption}$) so that it can be seen whether there is a net production of energy or a net consumption of energy (the outcome is higher or lower than 1, respectively). Alternatively, this may also be derived from the difference of the total electrical power production and the total electrical power consumption ($P_{total\ production} - P_{total\ consumption}$). A value higher than zero would then indicate a net production of energy, and a value below zero would then indicate a net consumption of energy. Therefore, the second processor circuit (13) may instead be configured to calculate the difference of the total electrical power production and the total electrical power consumption ($P_{total\ production} - P_{total\ consumption}$). The obtained value then represents the absolute excess (or deficit) of electrical power production within the group of households. In such case, the comparator (14) is configured to determine whether the difference ($P_{total\ production} - P_{total\ consumption}$) obtained by the second processor circuit (13) is above a first predetermined value or below a second predetermined value.

Whereas in the instance of the ratio ($P_{total\ production}/P_{total\ consumption}$), both predetermined values are dimensionless numbers, in the case of the difference ($P_{total\ production} - P_{total\ consumption}$) both predetermined values have the unit of the power.

For the purpose of the invention, the terms "first predetermined value" and "second predetermined value" are reserved for the dimensionless values that are to be compared with the ratio ($P_{total\ production}/P_{total\ consumption}$). As regards the predetermined values for the difference ($P_{total\ production} - P_{total\ consumption}$), these will be termed "first predetermined value for the power difference" and "second predetermined value for the power difference".

The invention further relates to a system (8) for balancing the loads of electrical power in a power grid, which system comprises an electrical power grid (7);

an electrical power balancing device (10) as described hereinabove for balancing the loads of electrical power in the electrical power grid (7).

a group of households (1) that are connected to the grid, wherein 1) the households (1) are equipped with a first electrical power measuring device (M1) (2) capable of measuring the net electrical power transmission ($P_{net}$) of the households (1);

2) at least one of the households (1) contains
   an electrical appliance (3b) operably connected to a switch, wherein the switch is configured to be operated by the first signal (16) and the second signal (17) of the signal generator (15); and/or
   a notification device (4) that can receive the first signal (16) and the second signal (17) of the signal generator, wherein the notification device (4) is configured to convert the first signal (16) and the second signal (17) into a notification.

3) at least one of the households (1) is capable of generating its own electrical power and feeding it to the electrical grid (7).

The at least one household (1) may comprise a second electrical power measuring device (M2) (6) that is capable of measuring the amount of electrical power that is generated in the household (1).

For the purpose of the invention, by a household is normally meant a unit comprising a house that accommodates its occupants that are living in the house. The term embraces however all units that do contain a building for human presence, not only a house wherein people actually live, but also schools, public buildings such as town halls and churches, hospitals, shopping malls, and (multi-story) parking garages. A system of the invention comprises at least two households.

The households (1) in a system (8) of the invention are schematically displayed in FIG. 1—one with a domestic power plant (5) and the second power measuring device (M2) (6) in connection thereto (right picture) and one without a domestic power plant (left picture). Both households contain 1) the first power measuring device (M1) located between the household and the grid; 2) an appliance (3a) with a manual switch; 3) an appliance (3b) with a switch that can be operated on a distance via a signal; and 4) a notification device (4).

Figure 3:
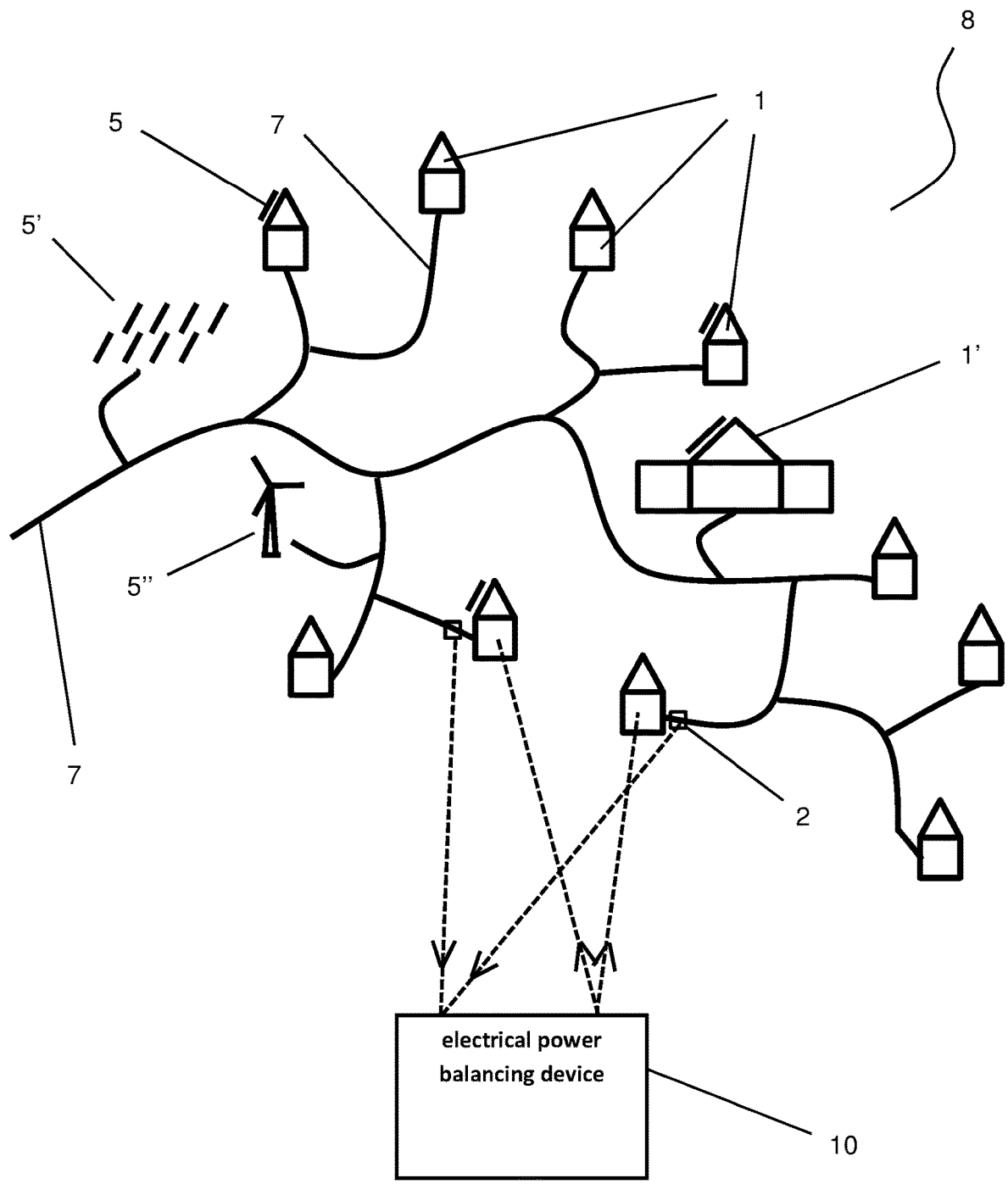
FIG. 3 is a schematic representation of a system according to the invention.

FIG. 3 is a schematic representation of a system (8) of the invention, displaying an electrical power grid (7), a group of households (1) that is connected to the grid (7) and an electrical power balancing device (10) of the invention. Some of the households contain a domestic power plant (5), which is indicated by a schematic photovoltaic panel on the roof (side-view)—of course other types of domestic power plants are also within the scope of the present invention. Possible interactions (e.g. a radiofrequency communication signal) between the households (1) and the electrical power balancing device (10) are shown with a dotted line; for the sake of clarity this is performed for only two households. These interactions are in particular the transfer of the values measured by the energy meter (2) to the electrical power balancing device (10) and the first signal (16) and the second signal (17) of the device (10) to the appliance (3b) and/or the notification device (4).

FIG. 3 also shows the connection to the grid of other entities than houses wherein people live, such as a school (1'), a (residential) solar energy park (5') and a windmill (5"). The school (1') is an entity within the meaning of household in the present invention, as explained above, because it is unit that can consume energy and provide its energy consumption data to an electrical power balancing device (10) of the invention. The solar energy park (5') and the windmill (5") are entities that are not regarded as a household for the purpose of the invention, because they only feed electrical energy to the grid (7) and do not have human inhabitants or consumers that need to be served by providing them with electrical power.

Thus, other entities than households may be connected to the grid (7), as long as their electrical power transmission can be measured and provided to an electrical power balancing device (10) of the invention. Such entities are for example (residential) solar energy parks and windmills. It is also a requirement (as is also the case for all grid-connected households) that such unit is within the area defined by the other entities that are connected to the grid, so that all energy flows in the grid (7) supporting that area can be accommodated for locally—the more remote one grid-connected entity is from the rest of the grid-connected entities, the less effective is the power balancing in that remote part of the area.

A system (8) of the invention is equipped to accommodate for fluctuations in the amount of power that is drawn from the grid (7) and fed to the grid (7). The fluctuations that can be accommodated for concern local fluctuations caused by separate households. This has the result that less damage occurs to electronic equipment in the grid's power distribution systems and that less energy is lost due to transport of power in the grid over long distances. Moreover, when large amounts of power are fed to the grid, there is no need anymore to shut off domestic power plants (5) or other decentralized power plants such as a solar energy park (5') and a windmill (5"). This increases the amount of decentralized (domestic) energy production and decreases the amount of centralized energy production.

In the group of households that are connected to the grid, in principle each household contains the first power measuring device (M1) capable of measuring the net electrical power transmission ($P_{net}$) of the household. This device is for example the smart meter as described hereinabove.

The electrical appliance (3b) that is operably connected to a switch is connected to the power supply of the household (1), so that the appliance, when it is turned on, obtains its power from the electrical power grid (or it obtains its power from the domestic power plant, if present, which plant is also in connection with the grid). The switch to which the appliance is connected is capable of turning the appliance on or off. Operating the switch is possible via the first and the second signal. To this end, the switch comprises a receiver arranged to receive the first and the second signal and is configured in such a way that it can be operated by the first and the second signal. When it receives the first signal it will turn on the appliance, and when it receives the second signal it will turn off the appliance.

In a system of the invention, the notification device (4) produces notifications under the command of the first and the second signal. The first signal results in the notification that there is a net electrical power production in the group of households and the second signal results in the notification that there is a net electrical power consumption in the group of households.

In a system of the invention, the notification device (4) may be a displaying device. One or more households may contain such displaying device, which is capable of displaying notifications such as the notification that there is a net electrical power production or a net electrical power consumption in the group of households. Such displaying device comprises 1) a receiver arranged to receive the first and the second signal of the signal generator, and 2) a displaying module comprising a screen, the module being configured to convert either signal into a notification and display the notification on the screen.

The displaying device may be a mobile telephone. Such device does not necessarily have to be in the household. The household contains such display in the sense that the display is capable of displaying information that is specifically adapted to and intended for the particular household.

In a system of the invention, the notification device may also be a sound generating device. Such device comprises 1) a receiver arranged to receive the first and the second signal of the signal generator, and 2) a loudspeaker module comprising a loudspeaker box, the module being configured to convert either signal into a notification and play the notification on the loudspeaker box.

Such sound generating device may also be a mobile telephone. In particular cases, such mobile phone may simultaneously act as a displaying device and a sound generating device as explained hereinabove.

The second power measuring device (M2) for measuring the amount of power that is generated is typically integrated with a power converter. Such converter is usually present to convert the direct current of the domestic power plant to the alternating current on which the household appliances generally operate and which can be fed to the grid.

For a household that has a net electrical power production, it is preferred that the household is given the chance to consume the excess electrical power within the household so that it is not fed to the grid, or that only a smaller amount of it is fed to the grid. This means that the net electrical power production is reduced by increasing the consumption in the household, which is to be performed before the first processor circuit (12) in the device (10) calculates the total electrical power production ($P_{total\ production}$) of those households that have a net electrical power production.

Accordingly, the system (8) of the present invention provides means for turning on one or more electrical appliances (3b) in a household in case the household has a net electrical power production. Conversely, means are also provided for turning off one or more electrical appliances in a household in case the household has a net electrical power consumption but at the same time also generates its own electrical power.

Two situations can be distinguished when providing means for turning on or off one or more electrical appliances (3b) in a household. These are the two situations that the household either comprises or does not comprise the second power measuring device (6) that is capable of measuring the amount of power that is generated in the household—or at least that use or no use is made from data generated by the second power measuring device (6).

Figure 4:
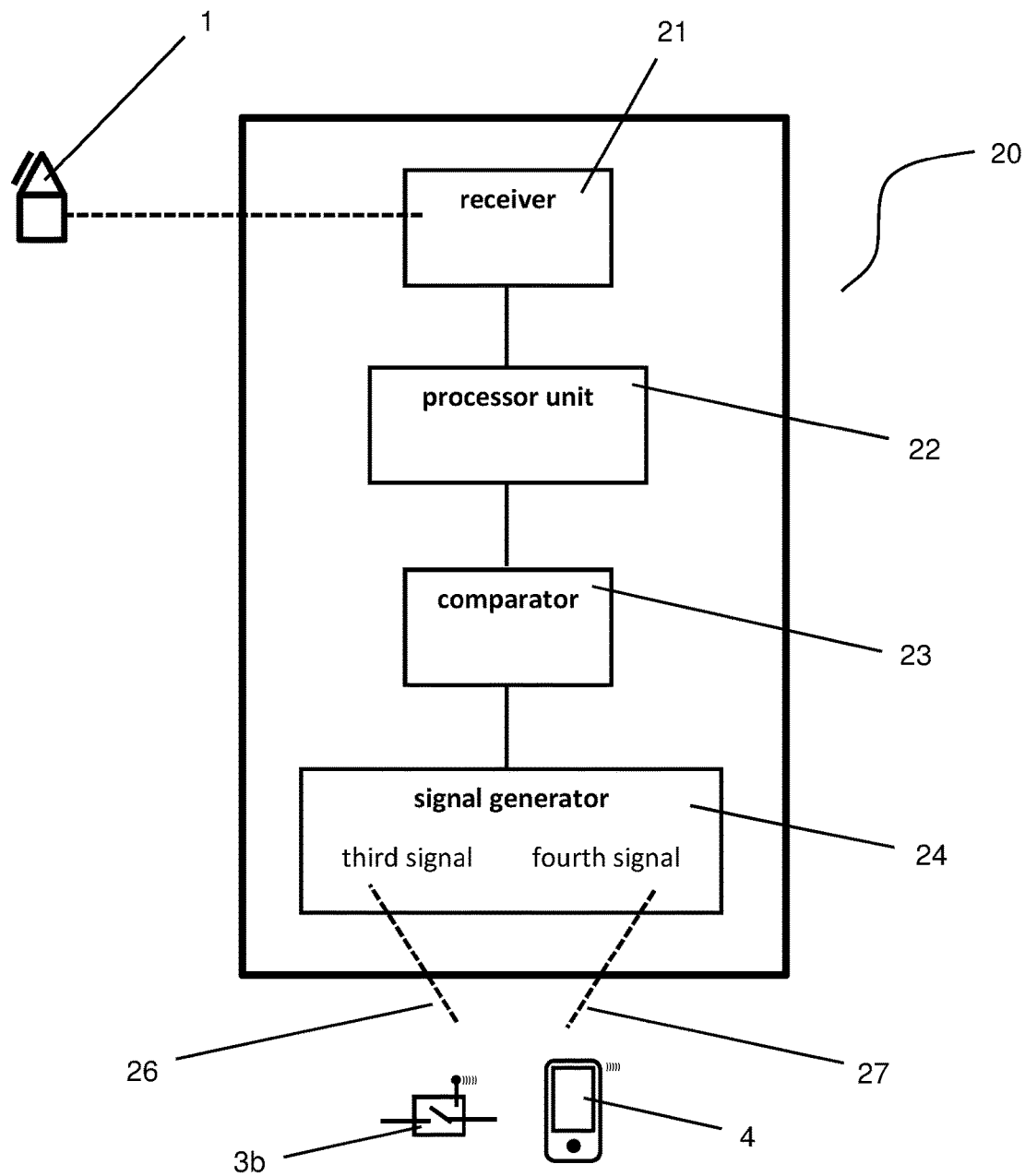
FIG. 4 is a schematic representation of a domestic device in a system of the invention.

When a household does comprise the second power measuring device (6), it uses the information of the first power measuring device (2) as well as the second power measuring device (6) to decide whether or not an additional power consumption in the household should be triggered. The system (8) of the invention may therefore be a system wherein the at least one households that is capable of generating its own electrical power and feeding it to the electrical grid comprises a domestic device (20) comprising a) a receiver (21) arranged to receive measurements from
the first power measuring device (2) that is capable of measuring the net electrical power transmission ($P_{net}$) of the household; and from
the second power measuring device (6) that is capable of measuring the amount of power that is generated in the household;

b) a processor circuit (22) configured to calculate the ratio of the electrical power production in the household and the electrical power consumption in the household ($P_{production}/P_{consumption}$);

c) a comparator (23) configured to determine whether the ratio ($P_{production}/P_{consumption}$) obtained by the processor circuit (22) is above a third predetermined value or below a fourth predetermined value;

d) a signal generator (24) configured to generate
a third signal (26) when the ratio ($P_{production}/P_{consumption}$) is above the third predetermined value, wherein the third signal (26)
1) causes an electrical appliance (3b) in the household (1) to turn on; and/or
2) notifies that there is a net electrical power production in the household (1);
a fourth signal (27) when the ratio ($P_{production}/P_{consumption}$) is below the fourth predetermined value, wherein the fourth signal (27)
1) causes an electrical appliance (3b) in the household (1) to turn off; and/or
2) notifies that there is a net electrical power consumption in the household (1);

FIG. 4 is a schematic representation of such domestic device (20), also displaying the input from the household it belongs to (dotted line from the household to the receiver) and the output in the form of the third signal (26) and the fourth signal (27), (dotted lines from the signal generator (24) to the switch (3b) and the notification device (4)).

In the domestic device (20) of the system (8), the processor circuit (22) is configured to calculate the ratio of the electrical power production and the electrical power consumption ($P_{production}/P_{consumption}$) in the household. For the household, the electrical power production ($P_{production}$) is obtained from the second power measuring device (6) that is capable of measuring the amount of power that is generated. The electrical power consumption ($P_{consumption}$) in the household may then obtained by subtracting the net electrical power production ($P_{net\ production}$, obtained from the first device (2)) from the electrical power production ($P_{production}$, obtained from the second device (6)).

The comparator (23) and the signal generator (24) act in a similar way to that in the electrical power balancing device (10). The signal generator (24) acts on the outcome of the action performed by the comparator (23). It generates a third signal (26) when the ratio ($P_{production}/P_{consumption}$) is above the third predetermined value; and it generates a fourth signal (27) when the ratio ($P_{production}/P_{consumption}$) is below the fourth predetermined value. The third signal (26) has the aim to increase the energy consumption (by e.g. causing an electrical appliance to turn on) while the fourth signal (27) has the aim to decrease the energy consumption (by e.g. causing an electrical appliance to turn off).

The third predetermined value is equal to or larger than the fourth predetermined value. For example, the third predetermined value is 1.5 and the fourth predetermined value is 0.5.

The third predetermined value may be, independently of the second predetermined value, in the range of 1-5, in the range of 1-3, or in the range of 1-2. Preferably, it is in the range of 1.2 and 1.8. The fourth predetermined value may be, independently of the third predetermined value, in the range of 0.2-1, in the range of 0.3-1, or in the range of 0.5-1. Preferably, it is in the range of 0.5-0.75. Values for the predetermined values are chosen with the condition that the third predetermined value is equal to or higher than the fourth predetermined value.

In the above description of the system (8) of the invention, the processor circuit (22) is configured to calculate the ratio ($P_{production}/P_{consumption}$) so that it can be seen whether there is a net production of energy or a net consumption of energy in the household (the outcome is higher or lower than 1, respectively). Alternatively, this may also be derived from the difference of the electrical power production in the household and the electrical power consumption in the household ($P_{production}-P_{consumption}$). A value higher than zero would then indicate a net production of energy, and a value below zero would then indicate a net consumption of energy. Therefore, the processor circuit (22) may instead be configured to calculate the difference of the electrical power production in the household and the electrical power consumption in the household ($P_{production}-P_{consumption}$). The obtained value then represents the absolute excess (or deficit) of electrical power production within the household. In such case, the comparator (23) is configured to determine whether the difference ($P_{production}-P_{consumption}$) obtained by the processor circuit (22) is above a third predetermined value or below a fourth predetermined value.

Whereas in the instance of the ratio ($P_{production}/P_{consumption}$), both predetermined values are dimensionless numbers, in the case of the difference ($P_{production}-P_{consumption}$) both predetermined values have the unit of the power.

For the purpose of the invention, the terms "third predetermined value" and "fourth predetermined value" are reserved for the dimensionless values that are to be compared with the ratio ($P_{production}/P_{consumption}$). As regards the predetermined values for the difference ($P_{production}-P_{consumption}$), these will be termed "third predetermined value for the power difference" and "fourth predetermined value for the power difference".

When a household does not comprise the second power measuring device (6), it uses only the information of the first power measuring device (2) to decide whether or not an additional power consumption in the household should be triggered. The system (8) of the invention may therefore be a system wherein the at least one households that is capable of generating its own electrical power and feeding it to the electrical grid comprises a domestic device (20) comprising
a) a receiver (21) arranged to receive measurements from the first power measuring device (2) that is capable of measuring the net electrical power production ($P_{net\ production}$) of the household (i.e. the electrical power fed to the grid);
b) a comparator (23) configured to determine whether the net electrical power production ($P_{net\ production}$) obtained by the receiver (21) is above a third predetermined value or below a fourth predetermined value;
c) a signal generator (24) configured to generate
a third signal (26) when the net electrical power production ($P_{net\ production}$) is above the third predetermined value, wherein the third signal (26)
1) causes an electrical appliance (3b) in the household (1) to turn on; and/or
2) notifies that there is a net electrical power production in the household (1);
a fourth signal (27) when the net electrical power production ($P_{net\ production}$) is below the fourth predetermined value, wherein the fourth signal (27)
1) causes an electrical appliance (3b) in the household (1) to turn off; and/or
2) notifies that there is a net electrical power consumption in the household (1);

The comparator (23) and the signal generator (24) act in a similar way to that described above for the system (8) of the invention that does comprise the second power measuring device (6). The signal generator (24) acts on the outcome of the action performed by the comparator (23). It generates a third signal (26) when the net electrical power production ($P_{net\ production}$) is above the third predetermined value, and it generates a fourth signal (27) when the net electrical power production ($P_{net\ production}$) is below the fourth predetermined value. The third signal (26) has the aim to increase the energy consumption (by e.g. causing an electrical appliance to turn on) while the fourth signal (27) has the aim to decrease the energy consumption (by e.g. causing an electrical appliance to turn off).

It is understood that the term "net electrical power production" ($P_{net\ production}$) in the system (8) above is used for all values of the net electrical power transmission ($P_{net}$), even in the case where there is a net electrical power consumption. In such case, the net electrical power consumption ($P_{net\ consumption}$) is regarded as the negative of the net electrical power production ($P_{net\ production}$), and will be expressed by a negative value for the net electrical power production ($P_{net\ production}$). For example, the fourth predetermined value typically is zero or a value below zero. The net electrical power production ($P_{net\ production}$) falls below such fourth predetermined value when it is a negative value (i.e. when there is a net electrical power consumption).

In a system (8) with the second power measuring device (6), a dimensionless number is used for comparing with the third and fourth predetermined value (because of the ratio ($P_{production}/P_{consumption}$))—and the third and fourth predetermined value are thus also dimensionless. When only the first power measuring device (2) is present in the system (8), then an actual power ($P_{net\ production}$) is compared with the third and fourth predetermined value—and the third and fourth predetermined value thus also have the unit of power.

For the purpose of the invention, the terms "third predetermined value" and "fourth predetermined value" are reserved for the dimensionless values that are to be compared with the ratio ($P_{production}/P_{consumption}$). As regards the third and fourth predetermined values for the net electrical power production ($P_{net\ production}$), these will be termed "third predetermined value for the net electrical power production ($P_{net\ production}$)" and "fourth predetermined value for the net electrical power production ($P_{net\ production}$)". In view of its absolute nature, the net electrical power production ($P_{net\ production}$) may directly be used to determine which electrical appliances (3b) in the households are turned on by the first signal.

Values for the third and fourth predetermined values for the net electrical power production ($P_{net\ production}$) are chosen with the condition that the third predetermined value for the net electrical power production ($P_{net\ production}$) is equal to or higher than the fourth predetermined value for the net electrical power production ($P_{net\ production}$).

The invention further relates to a method for balancing in an electrical grid (7), wherein the grid comprises a group of households that are connected to the grid, 1) the feeding of a surplus of electrical power to the grid by one or more households and 2) the consumption of electrical power from the grid by one or more households; the method comprising a) measuring the net electrical power transmission ($P_{net}$) of each of the households over a time interval ($t_1$), wherein the net electrical power transmission ($P_{net}$) of each of the households is an average value over the time interval ($t_1$), and wherein the net electrical power transmission ($P_{net}$) of each of the households may be a net electrical power production, a net electrical power consumption or a zero net electrical power production; thereafter b) calculating the total electrical power production ($P_{total\ production}$) of those households that have a net electrical power production and calculating the total electrical power consumption ($P_{total\ consumption}$) of those households that have a net electrical power consumption; thereafter c) calculating the ratio of the total electrical power production and the total electrical power consumption ($P_{total\ production}/P_{total\ consumption}$); thereafter d) determining whether the ratio ($P_{total\ production}/P_{total\ consumption}$) obtained under c) is above a first predetermined value or below a second predetermined value; thereafter e) in case the ratio ($P_{total\ production}/P_{total\ consumption}$) is above the first predetermined value, generating a first signal (16) which
   1) causes an electrical appliance in one of the households to turn on; or
   2) notifies that there is a net electrical power production in the group of households; thereafter f) in case the ratio ($P_{total\ production}/P_{total\ consumption}$) is below the second predetermined value, generating a second signal (17) which
   1) causes an electrical appliance in one of the households to turn off; or
   2) notifies that there is a net electrical power consumption in the group of households; thereafter g) repeating the sequence a)-f) at least once.

In the method of the invention, a database is created containing the net electrical power transmission ($P_{net}$) of each of the households. By the net electrical power transmission ($P_{net}$) of a household is meant the electrical power that the household as such draws from the grid or feeds to the grid. When it draws power from the grid, the household has a net consumption of energy, and when it feeds energy to the grid, it has a net production of energy.

The values for the consumption and production are measured by a power meter or electricity meter (M1) that is placed between the household and the grid. This may be any suitable device, for example the smart meter as described hereinabove. Such meter usually has a cumulative reading of the energy in kWh that passes the meter. The energy that has passed during a certain time interval can then be calculated by subtracting the reading at the beginning of the time interval from the reading at the end of the time interval. The actual electrical power (in e.g. W) can be calculated from the amount of energy (in e.g. kWh or J) and the length of the time interval (in e.g. seconds or minutes) by dividing the amount of energy by the duration of the time interval. The obtained electrical power is an average power during that time interval.

Since the conversion of electrical energy to electrical power in fact only entails dividing the energy by a fixed amount, which amount is in principle the same in each consecutive run of the method (because the time interval in principle remains the same), the method of the invention can also be performed by making use of the amount of energy that has passed during a certain time interval, and by not calculating the actual electrical power therefrom. It is therefore acknowledged that for the purpose of the invention, all terms in the device, system and method of the invention that are related to power (such as $P_{net}$, $P_{production}$, $P_{consumption}$, $P_{total\ production}$, $P_{consumption}$) may be replaced by terms that are related to energy (such as $E_{net}$, $E_{production}$, $E_{consumption}$, $E_{total\ production}$, $E_{total\ consumption}$, respectively).

In the event that there are two separate counters for the energy that passes the meter in either direction (which is usually the case in smart meters that are presently produced), the energy consumption from the grid as well as the energy production that is fed to the grid is measured. This means that separate records of both electricity flows are made. In this case, one counter produces the values of the net electrical energy transmission ($E_{net}$) in the case of a net consumption of energy, and the other counter produces the values of the net electrical energy transmission ($E_{net}$) in the case of a net production of energy. From these values, the net electrical power transmission ($P_{net}$) can be calculated in case of net electrical power consumption and in case of net electrical power production, by dividing the energy through the duration of the respective time interval.

The total electrical power consumption ($P_{total\ consumption}$) in the group of households can be calculated by making a summation of the net electrical power transmission ($P_{net}$) of all households that have a net electrical power consumption.

The total electrical power production ($P_{total\ production}$) in the group of households can be calculated similarly, e.g. by making a summation of the net electrical power transmission ($P_{net}$) of all households that have a net electrical power production.

For a useful real-time system and method, it is important that the time interval ($t_1$) is not too long. On the other hand, a too short interval may ask too much computational force with the result that the outcome of the calculations is delayed. A practical duration of the time interval is in the range of 1 second to 5 minutes, in particular in the range of 5 seconds to 2 minutes. Preferably, it is in the range of 9-66 seconds or in the range of 10-60 seconds.

In order be effective, the sequence of steps a)-e) in the method is performed a large number of times, for example during at least one day or during at least one week.

In an embodiment, the time interval ($t_1$) in the method of the invention is in the range of 9-66 seconds and the steps a)-f) are repeated during at least one day.

Next, the ratio of the total electrical power production and the total electrical power consumption ($P_{production}/P_{consumption}$) in the group of households is calculated. When the ratio ($P_{production}/P_{consumption}$) equals 1, then there is no net production and no net consumption of energy. When it is >1, then there is a net production of energy in the group of households and when it is <1, then there is a net consumption of energy in the group of households.

Thereafter, it is determined whether the ratio ($P_{total\ production}/P_{total\ consumption}$) is above a first predetermined value or below a second predetermined value. In case the ratio ($P_{total\ production}/P_{total\ consumption}$) is above the first predetermined value, then the first signal (16) is generated. In case the ratio ($P_{total\ production}/P_{total\ consumption}$) is below the second predetermined value, then the second signal (17) is generated.

The aim of the first signal (16) is to increase the energy consumption within the group of households, so that the excess of energy that is fed to the grid is used locally (in the group of households) rather than that it is transported over longer distances. This may be accomplished in two ways, either by turning on one or more extra electrical appliances in the group of households, or by notifying that there is a net electrical power production in the group of households. In the latter case, a person receiving such notification can decide to turn on one or more specific appliances.

The aim of the second signal (17) is to decrease the energy consumption within the group of households, so that the use of energy can be postponed to periods wherein there is an excess of energy within the group of households (e.g. caused by an excess in one or more households that is fed to the grid), rather than that the energy is obtained from a more distant centralized power plant which requires energy transport over longer distances. This may be accomplished in two ways, either by turning off one or more extra electrical appliances in the group of households, or by notifying that there is a net electrical power consumption in the group of households. In the latter case, a person receiving such notification can decide to turn off one or more specific appliances.

Not all electrical appliances are suitable in this method, because it may be undesired that their operation is interrupted by switching them on and off, such as computers, lighting and washing machines. Appliances that can more easily be turned off for limited periods of time are for example battery chargers and fridges.

The first and the second signal may in principle be addressed to any household in the group. Preferably, they are addressed to households that have a net electrical power consumption.

In the above description of the method for balancing power, the ratio of the total electrical power production and the total electrical power consumption ($P_{total\ production}/P_{total\ consumption}$) is calculated so that it can be seen whether there is a net production of energy or a net consumption of energy (the outcome is higher or lower than 1, respectively). Alternatively, this may also be performed by subtracting the total electrical power consumption from the total electrical power production ($P_{total\ production} - P_{total\ consumption}$). The obtained value then represents the absolute excess (or deficit) of electrical power production within the group of households. A value higher than zero would then indicate a net production of energy, and a value below zero would then indicate a net consumption of energy. In the next step, it is determined whether the difference ($P_{total\ production} - P_{total\ consumption}$) obtained in the previous step is above a first predetermined value for the power difference or below a second predetermined value for the power difference. On the basis of this outcome, a first or a second signal may be generated that triggers an increase or decrease, respectively, in the electrical power consumption in the group of households (e.g. by causing an electrical appliance in one of the households to turn on/off or by notifying that there is a net electrical power production/consumption in the group of households). In view of its absolute nature, the difference ($P_{total\ production} - P_{total\ consumption}$) may directly be used to decide which actual electrical appliance(s) in the household(s) may be turned on or off (e.g. by comparing their (average) power consumption with the difference ($P_{total\ production} - P_{total\ consumption}$).

Accordingly, the present invention further relates to a method for balancing in an electrical grid (7), wherein the grid comprises a group of households that are connected to the grid, 1) the feeding of a surplus of electrical power to the grid by one or more households and 2) the consumption of electrical power from the grid by one or more households; the method comprising a) measuring the net electrical power transmission ($P_{net}$) of each of the households over a time interval ($t_1$), wherein the net electrical power transmission ($P_{net}$) of each of the households is an average value over the time interval ($t_1$), and wherein the net electrical power transmission ($P_{net}$) of each of the households may be a net electrical power production, a net electrical power consumption or a zero net electrical power production; thereafter b) calculating the total electrical power production ($P_{total\ production}$) of those households that have a net electrical power production and calculating the total electrical power consumption ($P_{total\ consumption}$) of those households that have a net electrical power consumption; thereafter c) calculating the difference between the total electrical power consumption and the total electrical power production by subtracting the total electrical power consumption from the total electrical power production ($P_{total\ production} - P_{total\ consumption}$); thereafter d) determining whether the difference ($P_{total\ production} - P_{total\ consumption}$) obtained under c) is above a first predetermined value or below a second predetermined value; thereafter e) in case the difference ($P_{total\ production} - P_{total\ consumption}$) is above the first predetermined value, generating a first signal (16) which
  1) causes an electrical appliance (3b) in one of the households (1) to turn on; and/or
  2) notifies that there is a net electrical power production in the group of households (1); thereafter f) in case the difference ($P_{total\ production} - P_{total\ consumption}$) is below the second predetermined value, generating a second signal (17) which
  1) causes an electrical appliance (3b) in one of the households (1) to turn off; and/or
  2) notifies that there is a net electrical power consumption in the group of households; thereafter g) repeating the sequence a)-f) at least once.

In this method, by the first predetermined value is meant the "first predetermined value for the power difference" as defined hereinabove for the power balancing device. In addition, by the second predetermined value is meant the "second predetermined value for the power difference" as defined hereinabove for the power balancing device.

As elaborated hereinabove, an electrical power balancing device (10) in a system (8) of the invention is capable of generating a signal that alters the power consumption of the group of households, in particular the power consumption of one or more specific households in the group of households. This is performed by causing an electrical appliance in one of the households to turn on or off. This may be an appliance of any of the households, but it may also be an appliance in a selection of the households.

Generally, in case there is a choice between two or more appliances to turn on or off in e) and f) in the method of the invention, respectively, there may be a priority in which appliance is to be turned on or off, respectively. Thus, depending on the circumstances, the signal of the signal generator can be addressed to an appliance that has a certain priority under those circumstances.

Since the locations of the electrical appliances that can be turned on are known, as well as the locations of the households that have a net electrical power production, the electrical power balancing device may be configured in such a way that the appliance that is turned on is closest to the household that has a net electrical power production (or at least the household in which the appliance is present is closest). In this way, it is accomplished that the energy that is fed to the grid travels the shortest distance in the grid before it is consumed. The local use of an excess of electrical power thus results in a balancing of the electrical power in the grid.

Therefore, in a method of the invention, e) may comprise
- e1) identifying those households that have a net electrical power production, together with their location; and
- e2) identifying those electrical appliances that are in the state of being turned off, together with their location; and
- e3) determining for each of the households identified under e1) which electrical appliance identified under e2) is closest to each of the households identified under e1); and
- e4) generating the first signal to cause at least one of the electrical appliances resulting from e3) to turn on.

Thus, in this case the priority is such that appliances that are closer to a household where excess of electrical power is fed to the grid are turned on sooner than appliances that are more remote from such household. For each household it is known which switchable appliance is closest to the household that feeds electrical energy to the grid, and which is second closest, etc. Given the known energy excess of each net producing household and the—possibly adjustable—power of the appliance, balance on the grid can be achieved by switching on those appliances with the appropriate geographical position and capacity.

For the turning off of an appliance, there are different considerations for configuring the electrical power balancing device, because no account has to be taken of a household that has a net electrical power production. The choice for a particular appliance to turn off may for example be based on how much power is already being consumed in the direct proximity of the household of that appliance. For example, it may be advantageous to the grid that an appliance is turned off that is located in a part of the grid that already has a high power consumption. In this way, that part of the grid can be relieved. And when in that part of the grid a net electrical power production occurs at a later time, then the particular appliance can be turned on again.

Therefore, in a method of the invention, e) may also comprise
- e1) identifying those households that have a net electrical power consumption, together with their location; and
- e2) identifying those electrical appliances that are in the state of being turned on, together with their location; and
- e3) generating the second signal to cause at least one of the electrical appliances resulting from e2) to turn off.

Thus, when the system of the invention identifies that there is a net electrical power production or a net electrical power consumption in the group of households, a choice has to be made which appliance is to be turned on or turned off, respectively. As elaborated hereinabove, the choice may be based on the location of the appliance (or that of its household) and on the location of the household that has a total electrical power production. There are however other factors that may also be taken into consideration by the system of the invention. For example, the amount power that is requested by the particular appliance needs to match (at least to a certain extent) the amount of power that is available at a certain location where there is a net electrical power production.

As discussed hereinabove, it is preferred for a household that has a net electrical power production, that it is given the chance to consume the excess electrical power within the household so that it is not fed to the grid, or that only a smaller amount of it is fed to the grid. This means that the net electrical power production is reduced by increasing the consumption in the household, which is to be performed after step a) and before step b) in the method of the invention. Accordingly, the method of the invention may further comprise, after a) and before b),
- a1) identifying a household, in the group of households that is connected to the grid, wherein the ratio of the electrical power production in the household and the electrical power consumption in the household ($P_{production}/P_{consumption}$) is above a third predetermined value;
- a2) generating a third signal which
  1) causes an electrical appliance in the household identified in a1) to turn on, so that its net electrical power production is reduced to a lower production, to a zero production or to a net electrical power consumption; and/or
  2) notifies that the household identified in a1) has a net electrical power production;
- a3) measuring the net electrical power transmission ($P_{net}$) of the household identified in a1);
  - wherein the net electrical power transmission ($P_{net}$) obtained in a3) is used in the calculation of the total electrical power production ($P_{total\ production}$) in b).

The third signal aims at turning on an electrical appliance in the household identified in a1). Analogously to the first signal in the method for balancing as described hereinabove, this may be accomplished in two ways, either by turning on one or more extra electrical appliances in the household (those appliances that are in the state of being turned off), or by notifying that there is a net electrical power production in the household. In the latter case, a person receiving such notification can decide to turn on one or more specific appliances (that are in the state of being turned off).

Conversely, the method of the invention also provides for turning off one or more electrical appliances in a household in case the household has a net electrical power consumption but at the same time also generates its own electrical power. Accordingly, the method of the invention may further comprise, after a) and before b),
- a1) identifying a household, in the group of households that is connected to the grid, wherein the ratio of the electrical power production in the household and the electrical power consumption in the household ($P_{production}/P_{consumption}$) is below a fourth predetermined value and which household generates its own electrical power so that it is capable of having a net electrical power production;
- a2) generating a fourth signal which
  1) causes an electrical appliance in the household identified in a1) to turn off, so that its net electrical power consumption is reduced to a lower consumption, to a zero consumption or to a net electrical power production; and/or
  2) notifies that the household identified in a1) has a net electrical power consumption;
- a3) measuring the net electrical power transmission ($P_{net}$) of the household identified in a1);
  - wherein the net electrical power transmission ($P_{net}$) obtained in a3) is used in the calculation of the total electrical power production ($P_{total\ production}$) in b).

The fourth signal aims at turning off an electrical appliance in the household identified in a1). Analogously to the second signal in the method for balancing as described hereinabove, this may be accomplished in two ways, either by turning off one or more extra electrical appliances in the household (those appliances that are in the state of being turned on), or by notifying that there is a net electrical power consumption in the household. In the latter case, a person receiving such notification can decide to turn off one or more specific appliances (that are in the state of being turned on).

In the above description of the method for balancing power wherein a household is given the chance to consume the excess electrical power within the household (instead of feeding it to the grid), the ratio of the of the electrical power production in the household and the electrical power consumption in the household ($P_{production}/P_{consumption}$) is calculated so that it can be seen whether there is a net production of energy or a net consumption of energy within the household (the outcome is higher or lower than 1, respectively).

Alternatively, this may also be performed by obtaining the net electrical power production ($P_{net\ production}$) measured by the first power measuring device (2) of the household (i.e. the electrical power fed to the grid). The obtained value then represents the absolute excess (or deficit) of electrical power production in the household. A value higher than zero would then indicate a net production of energy, and a value below zero would then indicate a net consumption of energy in the household. In the next step, it is determined whether the net electrical power production ($P_{net\ production}$) obtained in the previous step is above a third predetermined value for the net electrical power production ($P_{net\ production}$) or below a fourth predetermined value for the net electrical power production ($P_{net\ production}$). On the basis of this outcome, a third or a fourth signal may be generated that triggers an increase or decrease, respectively, in the electrical power consumption in the household (e.g. by causing an electrical appliance in one of the households to turn on/off or by notifying that there is a net electrical power production/consumption in the group of households). In view of its absolute nature, the difference ($P_{production}-P_{consumption}$) may directly be used to decide which actual electrical appliance(s) in the household may be turned on or off (e.g. by comparing their (average) power consumption with the difference ($P_{production}-P_{consumption}$)).

Accordingly, the method of the invention may further comprise, after a) and before b), a1) identifying a household, in the group of households that is connected to the grid, wherein the net electrical power production ($P_{net\ production}$) is above a third predetermined value;

a2) generating a third signal which
  1) causes an electrical appliance in the household identified in a1) to turn on, so that its net electrical power production is reduced to a lower production, to a zero production or to a net electrical power consumption; and/or
  2) notifies that the household identified in a1) has a net electrical power production;

a3) measuring the net electrical power transmission ($P_{net}$) of the household identified in a1);
wherein the net electrical power transmission ($P_{net}$) obtained in a3) is used in the calculation of the total electrical power production ($P_{total\ production}$) in b).

Accordingly, the method of the invention may further comprise, after a) and before b), a1) identifying a household, in the group of households that is connected to the grid, wherein the net electrical power production ($P_{net\ production}$) is below a fourth predetermined value and which household generates its own electrical power so that it is capable of having a net electrical power production;

a2) generating a fourth signal which
  1) causes an electrical appliance in the household identified in a1) to turn off, so that its net electrical power consumption is reduced to a lower consumption, to a zero consumption or to a net electrical power production; and/or
  2) notifies that the household identified in a1) has a net electrical power consumption;

a3) measuring the net electrical power transmission ($P_{net}$) of the household identified in a1);
wherein the net electrical power transmission ($P_{net}$) obtained in a3) is used in the calculation of the total electrical power production ($P_{total\ production}$) in b).

As regards the third and fourth predetermined values in the above methods wherein the net electrical power production ($P_{net\ production}$) is obtained from the first power measuring device (2), these correspond to the terms "third predetermined value for the net electrical power production ($P_{net\ production}$)" and "fourth predetermined value for the net electrical power production ($P_{net\ production}$)", respectively—these terms have already been introduced hereinabove. In view of its absolute nature, the net electrical power production ($P_{net\ production}$) may directly be used to determine which electrical appliance (3b) in the household is turned on by the first signal.

In the method of the invention, the first and the second signals can be generated as soon as the outcome of step d) is above a first predetermined value or below a second predetermined value. In theory, this means that in the consecutive runs of the method there can be an alternation between the first signal and the second signal, or that at least a very frequent change occurs from the first signal to the second signal to the first signal and so on. This can cause a frequent turning on and off of appliances, or it can result in an undesirable high amount of notifications. To prevent such frequent changes, it is possible to carry out the method of the invention in such a way that the signal in step e) is only generated when the outcome of step d) (i.e. either above a first predetermined value or below a second predetermined value) is the same in a plurality of consecutive runs of the sequence of steps a)-d). For example, the outcome is the same in 2, 3, 4, 5, 6, 7, 8, 9 or 10 consecutive runs. Accordingly, the method of the invention may be a method wherein 1) the sequence a)-d) is performed a plurality of times before e) is carried out; and wherein
2) a signal is only generated in e) in case the ratio ($P_{total\ production}/P_{total\ consumption}$) is above the first predetermined value in a plurality of consecutive sequences a)-d); and wherein
3) a signal is only generated in f) in case the ratio ($P_{total\ production}/P_{total\ consumption}$) is below the second predetermined value in a plurality of consecutive sequences a)-d).

The invention further relates to a storage device for use in a device, system or method of the invention, which contains information on 1) the power usage of a plurality of electrical appliances when they are in the state of being turned on;
2) whether the electrical appliances are in the state of being turned on or turned off;
3) the geographical locations of the electrical appliances.

The invention further relates to a computer readable medium comprising transitory or non-transitory data representing instructions to cause a processor system to perform the method of the invention.

The invention further relates to software arranged to perform the method of the invention when executed on a computer.

In view of the fact that all terms in the device, system and method of the invention that are related to electrical power (P) may be replaced by terms that are related to electrical energy (E), as described hereinabove, the invention further relates to an electrical energy balancing device for balancing, in an electrical power grid, the feeding of a surplus of energy to the grid with the consumption of energy from the grid, the device comprising a) a receiver arranged to receive measurements from a group of grid-connected households of their net electrical energy transmission ($E_{net}$) during a time interval ($t_1$), wherein each household, during the time interval ($t_1$), may have a net electrical energy production, a net electrical energy consumption or a zero net electrical energy production (and thus also a zero net electrical power consumption);

b) a first processor circuit configured to calculate the total electrical energy production ($E_{total\ production}$) of those households that have a net electrical energy production during the time interval ($t_1$) and the total electrical energy consumption ($E_{total\ consumption}$) of those households that have a net electrical energy consumption during the time interval ($t_1$);

c) a second processor circuit configured to calculate the ratio of the total electrical energy production and the total electrical energy consumption ($E_{total\ production}/E_{total\ consumption}$);

d) a comparator configured to determine whether the ratio ($E_{total\ production}/E_{total\ consumption}$) obtained by the second processor circuit is above a first predetermined value or below a second predetermined value;

e) a signal generator configured to generate
  a first signal when the ratio ($E_{total\ production}/E_{total\ consumption}$) is above the first predetermined value, wherein the first signal
    1) causes an electrical appliance in one of the households to turn on; and/or
    2) notifies that there is a net electrical energy production in the group of households;
  a second signal when the ratio ($E_{total\ production}/E_{total\ consumption}$) is below the second predetermined value, wherein the second signal
    1) causes an electrical appliance in one of the households to turn off; or
    2) notifies that there is a net electrical energy consumption in the group of households.

Accordingly, the invention further relates to a system for balancing the loads of electrical energy in a power grid, which system comprises
an electrical power grid;
an electrical energy balancing device as described hereinabove for balancing the loads of electrical energy in the electrical power grid.
a group of households that are connected to the grid, wherein
  1) the households are equipped with a first electrical energy measuring device (M1) capable of measuring the net electrical energy transmission ($P_{net}$) of the households;
  2) at least one of the households contains
    an electrical appliance operably connected to a switch, wherein the switch is configured to be operated by the first and the second signal; and/or
    a notification device that can receive the first and the second signal of the signal generator, wherein the notification device is configured to convert the first and the second signal into a notification.
  3) at least one household is capable of generating its own electrical energy and feeding it to the electrical grid, the at least one household comprising a second electrical energy measuring device (M2) that is capable of measuring the amount of energy that is generated in the household.

Accordingly, the invention further relates to a method for balancing in an electrical grid (7), wherein the grid comprises a group of households that are connected to the grid, 1) the feeding of a surplus of electrical power to the grid by one or more households and 2) the consumption of electrical power from the grid by one or more households; the method comprising a) measuring the net electrical energy transmission ($E_{net}$) of each of the households during a time interval ($t_1$), wherein the net electrical energy transmission ($E_{net}$) of each of the households may be a net electrical energy production, a net electrical energy consumption or a zero net electrical energy production; thereafter b) calculating the total electrical energy production ($E_{total\ production}$) of those households that have a net electrical energy production and calculating the total electrical energy consumption ($E_{total\ consumption}$) of those households that have a net electrical energy consumption; thereafter c) calculating the ratio of the total electrical energy production and the total electrical energy consumption ($P_{total\ production}/P_{total\ consumption}$); thereafter d) determining whether the ratio ($E_{total\ production}/E_{total\ consumption}$) obtained under c) is above a first predetermined value or below a second predetermined value; thereafter e) in case the ratio ($E_{total\ production}/E_{total\ consumption}$) is above the first predetermined value, generating a first signal which
  1) causes an electrical appliance in one of the households to turn on; or
  2) notifies that there is a net electrical energy production in the group of households; thereafter f) in case the ratio ($E_{total\ production}/E_{total\ consumption}$) is below the second predetermined value, generating a second signal which
  1) causes an electrical appliance in one of the households to turn off; or
  2) notifies that there is a net electrical energy consumption in the group of households; thereafter g) repeating the sequence a)-f) at least once.

When in a device, system or method of the present invention a ratio of two variables or a difference of two variables is calculated, such as the ratio ($P_{total\ production}/P_{total\ consumption}$), the ratio ($P_{production}/P_{consumption}$), and the difference ($P_{total\ production} - P_{total\ consumption}$), it is recognized that it is evident for a man skilled in the art that an identical outcome or effect of the device, system or method can be obtained when the reciprocal value of the ratio or the opposite value of the difference is calculated, respectively, followed by applying the appropriate mathematics to correct for the performance of the reciprocal or opposite calculation. Similarly, determining whether a certain ratio numerator/denominator (such as the ratio $P_{total\ production}/P_{total\ consumption}$) lies above (or below) a predetermined value, is equivalent to determining whether the numerator lies above (or below) the outcome of multiplying the denominator with the predetermined value.

EXAMPLES

In a district of a medium-sized Dutch city, a pilot was run during the period May-July 2017, wherein the device, system, method, storage device, computer readable medium and software of the invention were carried out. One of the aims was to realize a balancing of the supply with the consumption of electricity in the local low-voltage power grid. The number of households in the district that participated is 70, among which are owner-occupied houses, privately rented houses, housing association houses, five local entrepreneurs and one community center. This particular district was chosen because of the mix of inhabitants—with such mix it is expected that the periods wherein people are residing in the participating households is well spread over the day (in contrast to e.g. a district with mainly commuters), and that at any moment of the day a substantial number of inhabitants is able to consume energy and steer the demand for electricity. Of the 64 houses (for living), nine were equipped with solar panels. The community center was equipped with 68 panels. The total Watt Peak of this group in the district concerns 36,960 Wp.

All participating households had a smart energy meter from the grid operator. The meters were of different types of the brands Iskra and Landys+Gyr, but their functionalities for the purpose of the pilot were the same. Every smart meter had an add-on connected to its P1-port. This is a device that monitors the energy transmission through the smart meter and sends the obtained the electricity data wirelessly to a central server comprising a database and the electrical power balancing device of the invention. Upon registration of the add-on by a participant, a personal account of the particular household was created, thereby forming a UUID (universally unique identifier) in the database on the server. Through this UUID the household participates in an anonymous manner.

Each participating household also made use of an application run on a mobile device. This is an "app" for e.g. a smartphone or tablet, specifically designed for this purpose. Logging in occurred with the same login credentials as used during the registration process of the energy monitor. With this login, the mobile device is linked to the smart meter of the household and to the electricity data of the district. Multiple residents in one household can log in simultaneously with several devices. Per household (with and without solar panels) there were on average two residents who had downloaded the app and used it for the purpose of the pilot.

The app provided for each participating inhabitant a real-time insight into his household's consumption and that of the entire group of households. Also the amount of self-generated electricity that was fed to the grid was real-time available via the app. The participating inhabitants were reached with push messages on their mobile devices at moments of high surpluses of electricity generation in the district, allowing them to choose their moments of power consumption in case of high local surpluses. As an extra incentive for changing their energy consumption, the inhabitants could also earn so-called "E-points", which is a local currency.

Figure 6:
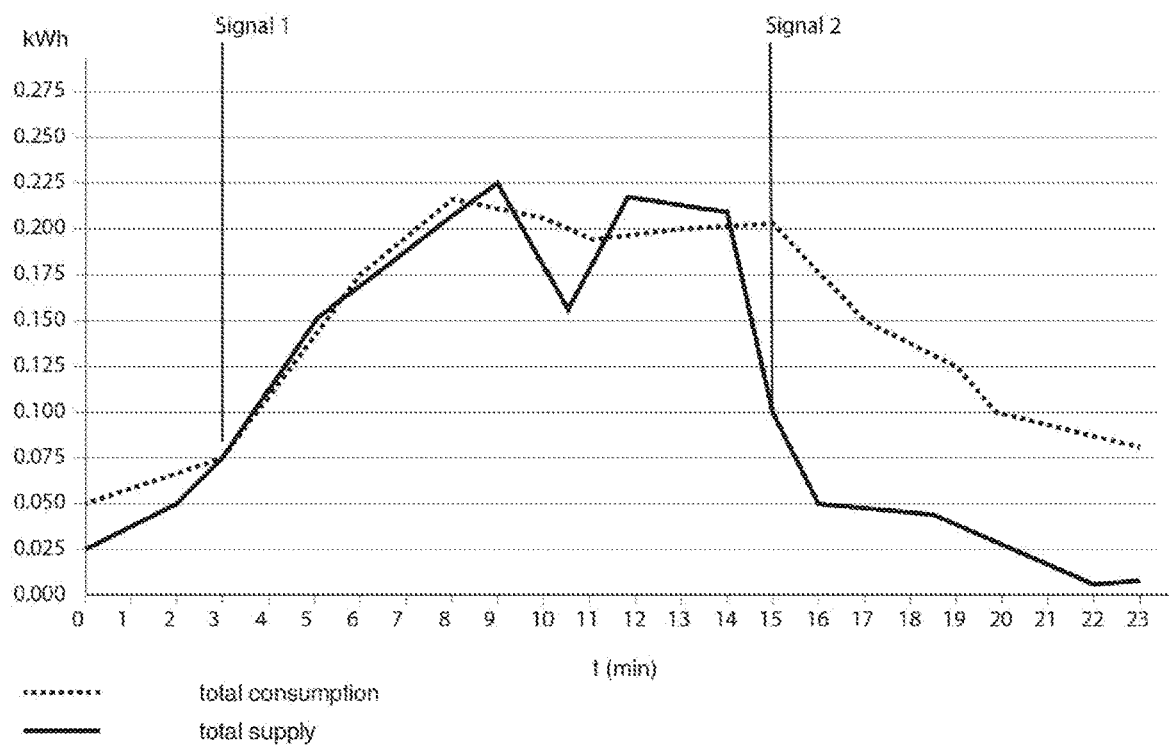
FIG. 6 is a graph representing the course of the total electrical power production and the total electrical power consumption in a group of households over time.

FIG. 6 displays the course of the total electrical power production (solid line) and the total electrical power consumption (dotted line) in the group of participating households over time. When the total production exceeded the total consumption (solid>dotted or solid/dotted>1), a surplus of electricity in the grid occurred. This triggered the sending of Signal 1; all households received a first standard message from the server on their mobile device ("A lot of power is generated in your street! Consume electricity now and earn E-Points"). When this text message was posted, it was seen that the total energy consumption of the neighborhood increased immediately, from which it can be concluded that the participating residents turn on electrical appliances in their households after having received the text message. This proves that the system indeed activates households to use more electricity if residents are informed of the fact that there is a surplus of power in the local voltage-grid that is available to them.

When the surplus of electricity in the grid was completely consumed (solid<dotted or the equivalent solid/dotted<1) so that the district as a whole became a net energy consumer (although there may then still be households with a net electrical power production), all households received a second standard message from the server on their mobile device ("There is no more surplus of electricity, postpone your power consumption"). When this text message was posted, it was seen that the total energy consumption of the neighborhood decreased immediately. Since the switch to a net energy consumer happened quite regularly, the second message was only sent when the total power consumption was double the total power production, so that participants were not overwhelmed with messages. This concerns Signal 2 in FIG. 6, which is triggered by the situation wherein solid×2<dotted or the equivalent solid/dotted<½.

Figure 7:
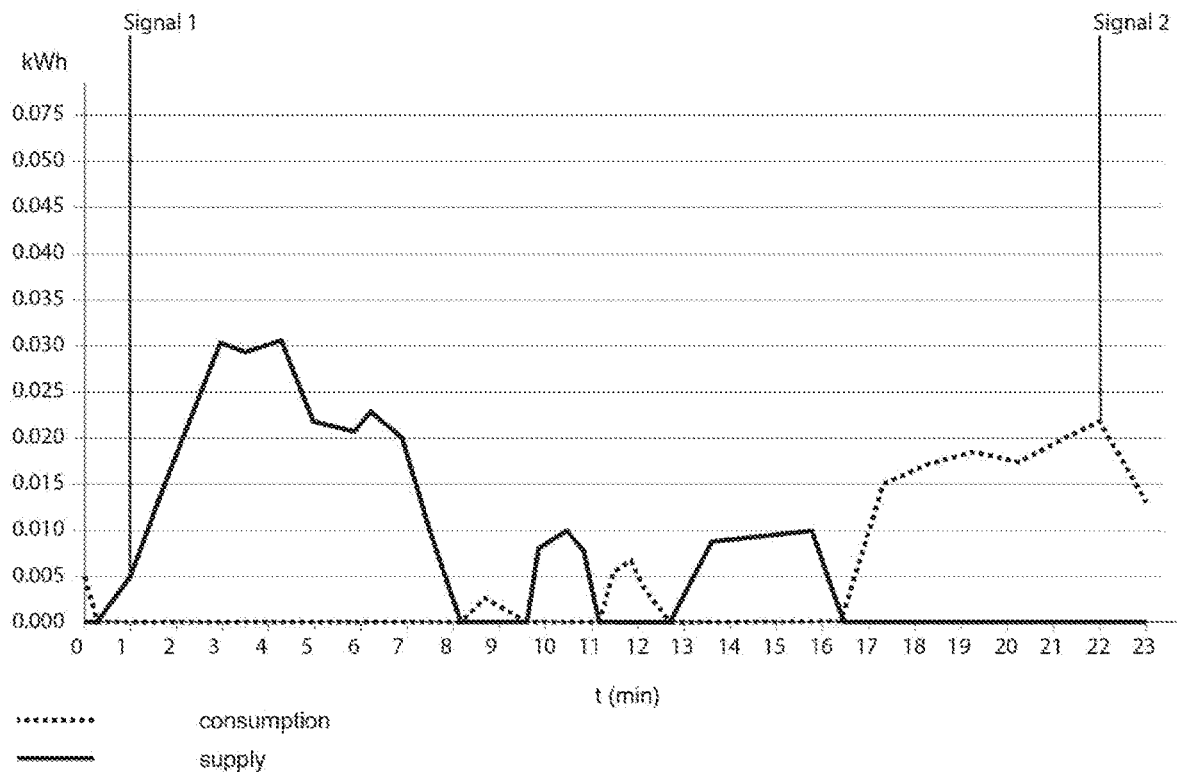
FIG. 7 is a graph representing the course of the net electrical power production and the net electrical power consumption in a single household over time.

The households with solar panels also received messages. This occurred in particular when they delivered electricity to the grid, to ensure that they return as little as possible. FIG. 7 displays the course of the net electrical power production (solid line) and the net electrical power consumption (dotted line) in a single participating household over time. When a net production occurred in the household (solid line not on the baseline and dotted line on the baseline), a surplus of electricity is fed to the grid. This triggered the sending of Signal 1; the participating households received a message when they delivered electricity to the grid ("You are delivering power to the grid. Consume your electricity now and earn E-Points"). In practice, such households usually were not able to completely consume their generated electricity. It is however expected that in the future, households will contain more electrical charging facilities such as required for e.g. electric vehicles, which will reduce the overall amount of electricity fed back to the grid. When the generated electrical power was completely consumed (dotted line not on the baseline and solid line on the baseline), the household became a net consumer of electrical power (thus drawing power from the grid). This triggered the sending of Signal 2 (FIG. 7); the participants in the household received the second message ("You're not supplying power to the grid anymore, postpone your power consumption"). Also in this case a delay in the second signal was built in to prevent participants from being flooded with messages. The second message was only sent when a net consumption of electrical power was measured for a consecutive period of 5 minutes. A flip to a net consumption in a household may occur easily, for example, when a cloud passes over the solar cells or when the switched-on device(s) consume just a little bit more power than the production at that moment. It appeared that within this district, these messages were effective in achieving an increased use of self-generated electrical power. The exact values that trigger a message can be set differently for every street, neighborhood and household.

With the help of questionnaires insights have been gathered about the experience with this pilot. Of the participants 18% indicated to have changed their routine in using devices at other times, while 59% did this occasionally. To shift the energy demand, the washing machine was used by 73% of the participants and the dishwasher by 35% of the participants. On average, 1.5 devices were used for demand shift.

The invention claimed is:

1. An electrical power balancing device for balancing, in an electrical power grid, feeding of a surplus of power to the grid with consumption of power from the grid, the device comprising:
   a) a receiver arranged to receive measurements from a group of grid-connected households of their net electrical power transmission ($P_{net}$), wherein each household may have a net electrical power production, a net electrical power consumption or a zero net electrical power production;
   b) a first processor circuit configured to calculate a total electrical power production ($P_{total\ production}$) of those households that have a net electrical power production and a total electrical power consumption ($P_{total\ consumption}$) of those households that have a net electrical power consumption;
   c) a second processor circuit configured to calculate a ratio of the total electrical power production and the total electrical power consumption ($P_{total\ production}/P_{total\ consumption}$);
   d) a comparator configured to determine whether the ratio ($P_{total\ production}/P_{total\ consumption}$) obtained by the second processor circuit is above a first predetermined value or below a second predetermined value;
   e) a signal generator configured to generate
      a first signal when the ratio ($P_{total\ production}/P_{total\ consumption}$) is above the first predetermined value, wherein the first signal
         1) causes an electrical appliance in one of the households to turn on; and/or
         2) notifies that there is a net electrical power production in the group of households;
      a second signal when the ratio ($P_{total\ production}/P_{total\ consumption}$) is below the second predetermined value, wherein the second signal
         1) causes an electrical appliance in one of the households to turn off; and/or
         2) notifies that there is a net electrical power consumption in the group of households.

2. The electrical power balancing device according to claim 1, wherein the first predetermined value is in the range of 1-2 and wherein the second predetermined value is in the range of 0.5-1.

3. A system for balancing loads of electrical power in a power grid, comprising
   an electrical power grid;
   the device of claim 1 for balancing the loads of electrical power in the electrical power grid;
   a group of households that are connected to the grid, wherein
   1) the households are equipped with a first electrical power measuring device capable of measuring the net electrical power transmission ($P_{net}$) of the households;
   2) at least one of the households contains
      an electrical appliance operably connected to a switch, wherein the switch is configured to be operated by the first signal and the second signal of the signal generator; and/or
      a notification device that can receive the first signal and the second signal of the signal generator, wherein the notification device is configured to convert the first signal and the second signal into a notification; and
   3) at least one of the households is capable of generating its own electrical power and feeding it to the electrical grid, the at least one household comprising a second electrical power measuring device capable of measuring an amount of electrical power that is generated in the household.

4. The system according to claim 3, wherein the notification device comprises
   a receiver arranged to receive the first signal and the second signal of the signal generator, and
   a displaying module comprising a screen, the module being configured to convert either signal into a notification and display the notification on the screen.

5. The system according to claim 3, wherein the at least one households that is capable of generating its own electrical power and feeding it to the electrical grid comprises a domestic device comprising
   a) a receiver arranged to receive measurements from
      the first power measuring device that is capable of measuring the net electrical power transmission ($P_{net}$) of the household; and from
      the second power measuring device that is capable of measuring the amount of power that is generated in the household;
   b) a processor circuit configured to calculate a household ratio of the electrical power production in the household and the electrical power consumption in the household ($P_{production}/P_{consumption}$);
   c) a comparator configured to determine whether the h ratio ($P_{production}/P_{consumption}$) obtained by the processor circuit is above a third predetermined value or below a fourth predetermined value;
   d) a signal generator configured to generate
      a third signal when the household ratio ($P_{production}/P_{consumption}$) is above the third predetermined value, wherein the third signal
         1) causes an electrical appliance in the household to turn on; and/or
         2) notifies that there is a net electrical power production in the household;
      a fourth signal when the ratio ($P_{production}/P_{consumption}$) is below the fourth predetermined value, wherein the fourth signal
         1) causes an electrical appliance in the household to turn off; and/or
         2) notifies that there is a net electrical power consumption in the household.

6. A method for balancing in an electrical grid, wherein the grid comprises a group of households that are connected to the grid, 1) feeding of a surplus of electrical power to the grid by one or more households and 2) consumption of electrical power from the grid by one or more households; the method comprising:
   a) measuring a net electrical power transmission ($P_{net}$) of each of the households over a time interval ($t_j$), wherein the net electrical power transmission ($P_{net}$) of each of the households is an average value over the time interval ($t_j$), and wherein the net electrical power transmission ($P_{net}$) of each of the households may be a net electrical power production, a net electrical power consumption or a zero net electrical power transmission; thereafter
   b) calculating a total electrical power production ($P_{total\ production}$) of those households that have a net electrical power production and calculating a total electrical power consumption ($P_{total\ consumption}$) of those households that have a net electrical power consumption; thereafter c) calculating a ratio of the total electrical power production and the total electrical power consumption ($P_{total\ production}/P_{total\ consumption}$); thereafter d) determining whether the ratio ($P_{total\ production}/P_{total\ consumption}$) obtained under c) is above a first predetermined value or below a second predetermined value; thereafter e) in case the ratio ($P_{total\ production}/P_{total\ consumption}$) is above the first predetermined value, generating a first signal which
   1) causes an electrical appliance in one of the households to turn on; and/or
   2) notifies that there is a net electrical power production in the group of households; thereafter f) in case the ratio ($P_{total\ production}/P_{total\ consumption}$) is below the second predetermined value, generating a second signal which
   1) causes an electrical appliance in one of the households to turn off; and/or
   2) notifies that there is a net electrical power consumption in the group of households; thereafter g) repeating the sequence a)-f) at least once.

7. The method according to claim 6, wherein the time interval ($t_i$) is in the range of 9-66 seconds and the steps a)-f) are repeated during at least one day.

8. The method according to claim 6, further comprising, after a) and before b),
   a1) identifying a household, in the group of households that is connected to the grid, wherein a household ratio of the electrical power production in the household and the electrical power consumption in the household ($P_{total\ production}/P_{total\ consumption}$) is above a third predetermined value;
   a2) generating a third signal which
      1) causes an electrical appliance in the household identified in a1) to turn on, so that its net electrical power production is reduced to a lower production, to a zero production or to a net electrical power consumption; and/or
      2) notifies that the household identified in a1) has a net electrical power production; and
   a3) measuring a net electrical power transmission ($P_{net}$) of the household identified in a1);
   wherein the net electrical power transmission ($P_{net}$) obtained in a3) is used in the calculation of the total electrical power production ($P_{production}$) in b).

9. The method according to claim 6, further comprising, after a) and before b),
   a1) identifying a household, in the group of households that is connected to the grid, wherein a household ratio of the electrical power production in the household and the electrical power consumption in the household ($P_{total\ production}/P_{total\ consumption}$) is below a fourth predetermined value and which household generates its own electrical power so that it is capable of having a net electrical power production;
   a2) generating a fourth signal which
      1) causes an electrical appliance in the household identified in a1) to turn off, so that its net electrical power consumption is reduced to a lower consumption, to a zero consumption or to a net electrical power production; and/or
      2) notifies that the household identified in a1) has a net electrical power consumption; and
   a3) measuring a net electrical power transmission ($P_{net}$) of the household identified in a1);

wherein the net electrical power transmission ($P_{net}$) obtained in a3) is used in the calculation of the total electrical power production ($P_{total\ production}$) in b).

10. The method according to claim 6, wherein
   1) the sequence a)-d) is performed a plurality of times before e) is carried out; and
   wherein
   2) a signal is only generated in e) in case the ratio ($P_{total\ production}/P_{total\ consumption}$) is above the first predetermined value in a plurality of consecutive sequences a)-d); and wherein
   3) a signal is only generated in f) in case the ratio ($P_{total\ production}/P_{total\ consumption}$) is below the second predetermined value in a plurality of consecutive sequences a)-d).

11. The method according to claim 6, wherein in case there is a choice between two or more appliances that can be turned on or off in e) and f), respectively, there is a priority in which appliance is to be turned on or off, respectively.

12. The method according to claim 6, wherein e) comprises
   e1) identifying those households that have a net electrical power production, together with their location; and
   e2) identifying those electrical appliances that are in a state of being turned off, together with their location; and
   e3) determining for each of the households identified under e1) which electrical appliance of the electrical appliances identified under e2) is closest to each of the households identified under e1); and
   e4) generating the first signal to cause at least one of the electrical appliances resulting from e3) to turn on.

13. An electrical power balancing device for balancing, in an electrical power grid, feeding of a surplus of power to the grid with consumption of power from the grid, the device comprising:
   a) a receiver arranged to receive measurements from a group of grid-connected households of their net electrical power transmission ($P_{net}$), wherein each household may have a net electrical power production, a net electrical power consumption or a zero net electrical power production;
   b) a first processor circuit configured to calculate a total electrical power production ($P_{total\ production}$) of those households that have a net electrical power production and a total electrical power consumption ($P_{total\ consumption}$) of those households that have a net electrical power consumption;
   c) a second processor circuit configured to calculate a difference of the total electrical power production and the total electrical power consumption ($P_{total\ production} - P_{total\ consumption}$);
   d) a comparator configured to determine whether the difference ($P_{total\ production} - P_{total\ consumption}$) obtained by the second processor circuit is above a first predetermined value or below a second predetermined value;
   e) a signal generator configured to generate
      a first signal when the difference ($P_{total\ production} - P_{total\ consumption}$) is above the first predetermined value, wherein the first signal
         1) causes an electrical appliance in one of the households to turn on; and/or
         2) notifies that there is a net electrical power production in the group of households; and
      a second signal when the difference ($P_{total\ production} - P_{total\ consumption}$) is below the second predetermined value, wherein the second signal 1) causes an electrical appliance in one of the households to turn off; and/or
2) notifies that there is a net electrical power consumption in the group of households.

14. The electrical power balancing device according to claim 13, wherein the first predetermined value is in the range of 1-2 and wherein the second predetermined value is in the range of 0.5-1.

15. A system for balancing loads of electrical power in a power grid, comprising
an electrical power grid;
the device of claim 13 for balancing the loads of electrical power in the electrical power grid;
a group of households that are connected to the grid, wherein
1) the households are equipped with a first electrical power measuring device capable of measuring the net electrical power transmission ($P_{net}$) of the households;
2) at least one of the households contains
an electrical appliance operably connected to a switch, wherein the switch is configured to be operated by the first signal and the second signal of the signal generator; and/or
a notification device that can receive the first signal and the second signal of the signal generator, wherein the notification device is configured to convert the first signal and the second signal into a notification; and
3) at least one of the households is capable of generating its own electrical power and feeding it to the electrical grid, the at least one household comprising a second electrical power measuring device capable of measuring an amount of electrical power that is generated in the household.

16. The system according to claim 15, wherein the notification device comprises
a receiver arranged to receive the first signal and the second signal of the signal generator, and
a displaying module comprising a screen, the module being configured to convert either signal into a notification and display the notification on the screen.

17. The system according to claim 15, wherein the at least one households that is capable of generating its own electrical power and feeding it to the electrical grid comprises a domestic device comprising:
a) a receiver arranged to receive measurements from
the first power measuring device that is capable of measuring the net electrical power transmission ($P_{net}$) of the household; and from
the second power measuring device that is capable of measuring the amount of power that is generated in the household;
b) a processor circuit configured to calculate a household difference of the electrical power production in the household and the electrical power consumption in the household ($P_{production}$-$P_{consumption}$);
c) a comparator configured to determine whether the household difference ($P_{production}$-$P_{consumption}$) obtained by the processor circuit is above a third predetermined value or below a fourth predetermined value;
d) a signal generator configured to generate
a third signal when the household difference ($P_{production}$-$P_{consumption}$) is above the third predetermined value, wherein the third signal
1) causes an electrical appliance in the household to turn on; and/or
2) notifies that there is a net electrical power production in the household;
a fourth signal when the household difference ($P_{production}$-$P_{consumption}$) is below the fourth predetermined value, wherein the fourth signal
1) causes an electrical appliance in the household to turn off; and/or
2) notifies that there is a net electrical power consumption in the household.

18. A method for balancing in an electrical grid, wherein the grid comprises a group of households that are connected to the grid, 1) feeding of a surplus of electrical power to the grid by one or more households and 2) consumption of electrical power from the grid by one or more households; the method comprising:
a) measuring a net electrical power transmission ($P_{net}$) of each of the households over a time interval ($t_1$), wherein the net electrical power transmission ($P_{net}$) of each of the households is an average value over the time interval ($t_1$), and wherein the net electrical power transmission ($P_{net}$) of each of the households may be a net electrical power production, a net electrical power consumption or a zero net electrical power transmission; thereafter
b) calculating a total electrical power production ($P_{total\ production}$) of those households that have a net electrical power production and calculating a total electrical power consumption ($P_{total\ consumption}$) of those households that have a net electrical power consumption; thereafter
c) calculating a difference of the total electrical power production and the total electrical power consumption ($P_{production}$-$P_{consumption}$); thereafter
d) determining whether the difference ($P_{total\ production}$-$P_{total\ consumption}$) obtained under c) is above a first predetermined value or below a second predetermined value; thereafter
e) in case the difference ($P_{total\ production}$-$P_{total\ consumption}$) is above the first predetermined value, generating a first signal which
1) causes an electrical appliance in one of the households to turn on; and/or
2) notifies that there is a net electrical power production in the group of households; thereafter
f) in case the difference ($P_{total\ production}$-$P_{total\ consumption}$) is below the second predetermined value, generating a second signal which
1) causes an electrical appliance in one of the households to turn off; and/or
2) notifies that there is a net electrical power consumption in the group of households; thereafter
g) repeating the sequence a)-f) at least once.

19. The method according to claim 18, wherein the time interval ($t_1$) is in the range of 9-66 seconds and the steps a)-f) are repeated during at least one day.

20. The method according to claim 18, wherein in case there is a choice between two or more appliances that can be turned on or off in e) and f), respectively, there is a priority in which appliance is to be turned on or off, respectively.

21. The method according to claim 18, wherein e) comprises
e1) identifying those households that have a net electrical power production, together with their location; and
e2) identifying those electrical appliances that are in a state of being turned off, together with their location; and e3) determining for each of the households identified under e1) which electrical appliance of the electrical appliances identified under e2) is closest to each of the households identified under e1); and e4) generating the first signal to cause at least one of the electrical appliances resulting from e3) to turn on.

22. An electrical energy balancing device for balancing, in an electrical energy grid, feeding of a surplus of energy to the grid with consumption of energy from the grid, the device comprising:

a) a receiver arranged to receive measurements from a group of grid-connected households of their net electrical energy transmission ($E_{net}$) during a time interval ($t_r$), wherein each household, during the time interval ($t_r$), may have a net electrical energy production, a net electrical energy consumption or a zero net electrical energy production;

b) a first processor circuit configured to calculate a total electrical energy production ($E_{total\ production}$) of those households that have a net electrical energy production during the time interval ($t_r$) and a total electrical energy consumption ($E_{total\ production}$) of those households that have a net electrical energy consumption during the time interval ($t_r$);

c) a second processor circuit configured to calculate a ratio of the total electrical energy production and the total electrical energy consumption ($E_{total\ producation}/E_{total\ consumption}$);

d) a comparator configured to determine whether the ratio ($E_{total\ producation}/E_{total\ consumption}$) obtained by the second processor circuit is above a first predetermined value or below a second predetermined value;

e) a signal generator configured to generate a first signal when the ratio ($E_{total\ producation}/E_{total\ consumption}$) is above the first predetermined value, wherein the first signal 1) causes an electrical appliance in one of the households to turn on; and/or 2) notifies that there is a net electrical energy production in the group of households; and a second signal when the ratio ($E_{total\ producation}/E_{total\ consumption}$) is below the second predetermined value, wherein the second signal 1) causes an electrical appliance in one of the households to turn off; and/or 2) notifies that there is a net electrical energy consumption in the group of households.

23. An electrical energy balancing device for balancing, in an electrical energy grid, feeding of a surplus of energy to the grid with consumption of energy from the grid, the device comprising:

a) a receiver arranged to receive measurements from a group of grid-connected households of their net electrical energy transmission ($E_{net}$) during a time interval ($t_r$), wherein each household, during the time interval ($t_r$), may have a net electrical energy production, a net electrical energy consumption or a zero net electrical energy production;

b) a first processor circuit configured to calculate a total electrical energy production ($E_{total\ production}$) of those households that have a net electrical energy production during the time interval ($t_r$) and a total electrical energy consumption ($E_{total\ consumption}$) of those households that have a net electrical energy consumption during the time interval ($t_r$);

c) a second processor circuit configured to calculate a difference of the total electrical energy production and the total electrical energy consumption ($E_{total\ production} - E_{total\ consumption}$);

d) a comparator configured to determine whether the difference ($E_{total\ production} - E_{total\ consumption}$) obtained by the second processor circuit is above a first predetermined value or below a second predetermined value;

e) a signal generator configured to generate a first signal when the difference ($E_{total\ production} - E_{total\ consumption}$) is above the first predetermined value, wherein the first signal 1) causes an electrical appliance in one of the households to turn on; and/or 2) notifies that there is a net electrical energy production in the group of households; and a second signal when the difference ($E_{total\ producation}/E_{total\ consumption}$) is below the second predetermined value, wherein the second signal 1) causes an electrical appliance in one of the households to turn off; and/or 2) notifies that there is a net electrical energy consumption in the group of households.

\* \* \* \* \*